US011424997B2

(12) United States Patent
Khan et al.

(10) Patent No.: US 11,424,997 B2
(45) Date of Patent: Aug. 23, 2022

(54) SECURED NETWORK MANAGEMENT DOMAIN ACCESS SYSTEM

(71) Applicant: Dell Products L.P., Round Rock, TX (US)

(72) Inventors: Zoheb Khan, Austin, TX (US); Sudhir Vittal Shetty, Cedar Park, TX (US); Joseph LaSalle White, San Jose, CA (US); Balaji Rajagopalan, Sunnyvale, CA (US); Venkata Bala Koteswararao Donepudi, Round Rock, TX (US); Pawan Kumar Singal, Milpitas, CA (US)

(73) Assignee: Dell Products L.P., Round Rock, TX (US)

(*) Notice: Subject to any disclaimer, the term of this patent is extended or adjusted under 35 U.S.C. 154(b) by 72 days.

(21) Appl. No.: 16/709,214

(22) Filed: Dec. 10, 2019

(65) Prior Publication Data
US 2021/0176139 A1 Jun. 10, 2021

(51) Int. Cl.
H04L 29/06 (2006.01)
H04L 29/08 (2006.01)
G06F 21/60 (2013.01)
G06F 21/44 (2013.01)
G06F 13/28 (2006.01)
H04L 12/28 (2006.01)
H04L 12/26 (2006.01)
G06F 15/177 (2006.01)
H04L 41/28 (2022.01)
(Continued)

(52) U.S. Cl.
CPC .......... H04L 41/28 (2013.01); H04L 12/4641 (2013.01); H04L 41/046 (2013.01); H04L 63/0815 (2013.01)

(58) Field of Classification Search
CPC . H04L 41/28; H04L 63/0815; H04L 12/4641; H04L 41/046
USPC ........................................................ 709/233
See application file for complete search history.

(56) References Cited

U.S. PATENT DOCUMENTS 6,256,747 B1* 7/2001 Inohara ............... H04L 41/0893
709/201
9,407,389 B2* 8/2016 Mizutani ............. H04L 43/0858
(Continued)

Primary Examiner — Kevin T Bates
Assistant Examiner — Golam Mahmud
(74) Attorney, Agent, or Firm — Joseph Mencher

(57) ABSTRACT

A secured network management domain access system includes a chassis housing a master I/O module that is configured to provide a network management domain, and a management module coupled to the master I/O module. The management module includes an enclosure controller coupled to the master I/O module via a first communication channel, and that retrieves master I/O module secured access information from the master I/O module via the first communication channel. The management module also includes a management service coupled to the enclosure controller via a second communication channel and to the master I/O module via a third communication channel, and that retrieves the master I/O module secured access information from the enclosure controller via the second communication channel, and performs validation operations with the master I/O module via the third communication channel such that the management service may securely access the network management domain via the master I/O module.

20 Claims, 19 Drawing Sheets

(51) Int. Cl.
*H04L 12/46* (2006.01)
*H04L 9/40* (2022.01)
*H04L 41/046* (2022.01)

(56) References Cited

U.S. PATENT DOCUMENTS

| | | | | |
|---|---|---|---|---|
| 9,424,148 | B2* | 8/2016 | Brundridge | G06F 11/203 |
| 10,126,719 | B2* | 11/2018 | Lee | H04L 43/10 |
| 10,148,516 | B2* | 12/2018 | Gopalarathnam | H04L 41/0806 |
| 10,366,025 | B2* | 7/2019 | Rahardjo | H04L 9/0844 |
| 2005/0144434 | A1* | 6/2005 | Taylor | G06F 15/177 |
| | | | | 713/2 |
| 2008/0043769 | A1* | 2/2008 | Hirai | H04L 41/042 |
| | | | | 370/420 |
| 2008/0098390 | A1* | 4/2008 | Karstens | G06F 8/60 |
| | | | | 717/178 |
| 2012/0033541 | A1* | 2/2012 | Jacob Da Silva | H04L 45/245 |
| | | | | 370/390 |
| 2013/0064102 | A1* | 3/2013 | Chang | H04L 49/65 |
| | | | | 370/255 |
| 2013/0117766 | A1* | 5/2013 | Bax | G06F 9/4405 |
| | | | | 719/323 |
| 2014/0229758 | A1* | 8/2014 | Richardson | G06F 11/3058 |
| | | | | 714/4.11 |
| 2014/0250239 | A1* | 9/2014 | Lambert | H04L 45/56 |
| | | | | 709/242 |
| 2014/0280196 | A1* | 9/2014 | Jung | H04L 67/02 |
| | | | | 709/219 |
| 2014/0286345 | A1* | 9/2014 | Mohandas | H04L 49/70 |
| | | | | 370/401 |
| 2014/0331060 | A1* | 11/2014 | Hayton | H04L 63/0428 |
| | | | | 713/185 |
| 2016/0103728 | A1* | 4/2016 | Shetty | H04L 41/065 |
| | | | | 714/57 |
| 2016/0380850 | A1* | 12/2016 | Duncan | H04L 43/0817 |
| | | | | 715/735 |
| 2018/0053004 | A1* | 2/2018 | Rahardjo | G06F 21/44 |
| 2018/0232256 | A1* | 8/2018 | Chaganti | G06F 9/5061 |
| 2018/0232290 | A1* | 8/2018 | Nara | G06F 11/1658 |
| 2018/0241643 | A1* | 8/2018 | Chaganti | G06F 3/061 |
| 2018/0255020 | A1* | 9/2018 | Shetty | H04L 67/16 |

* cited by examiner

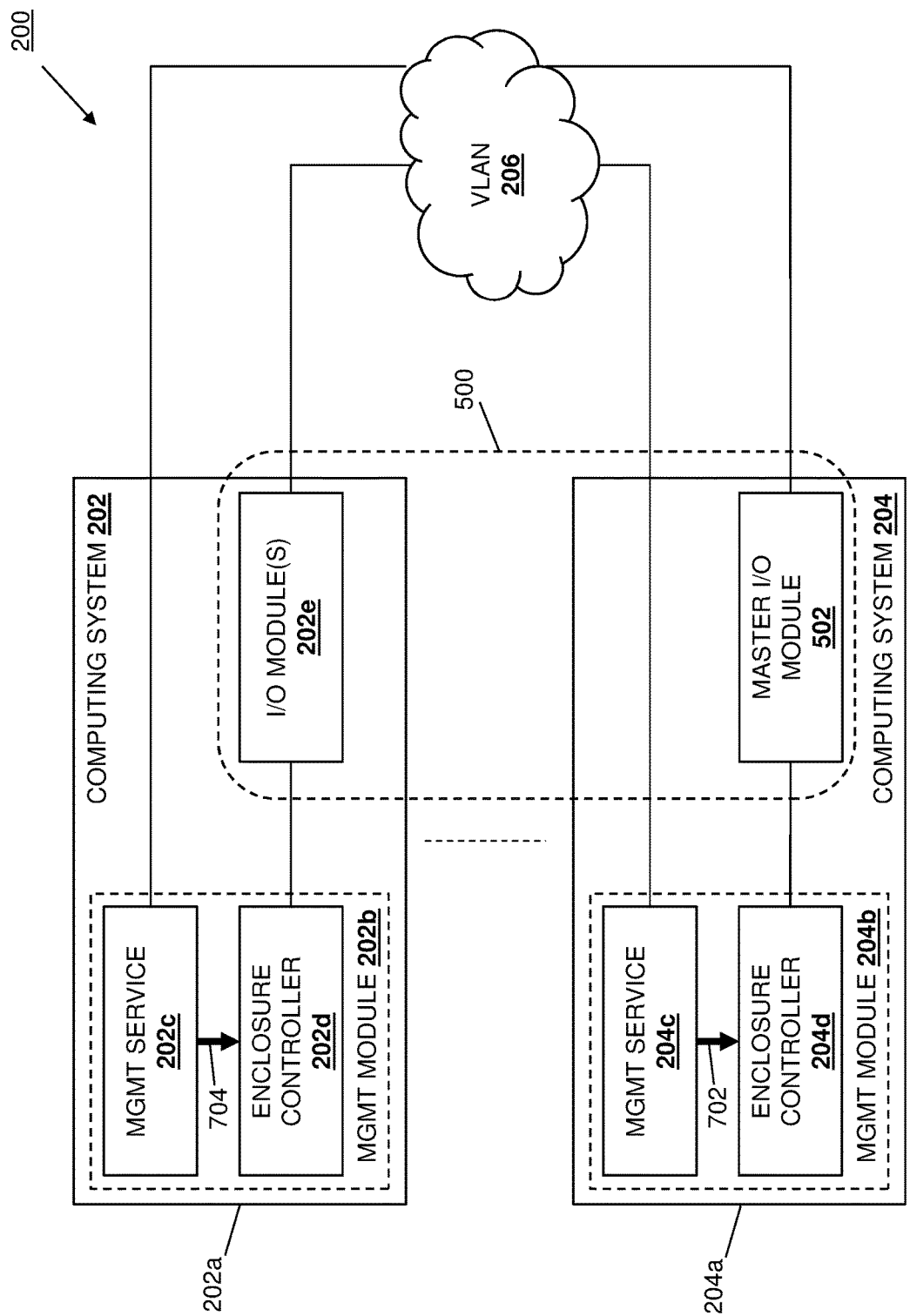

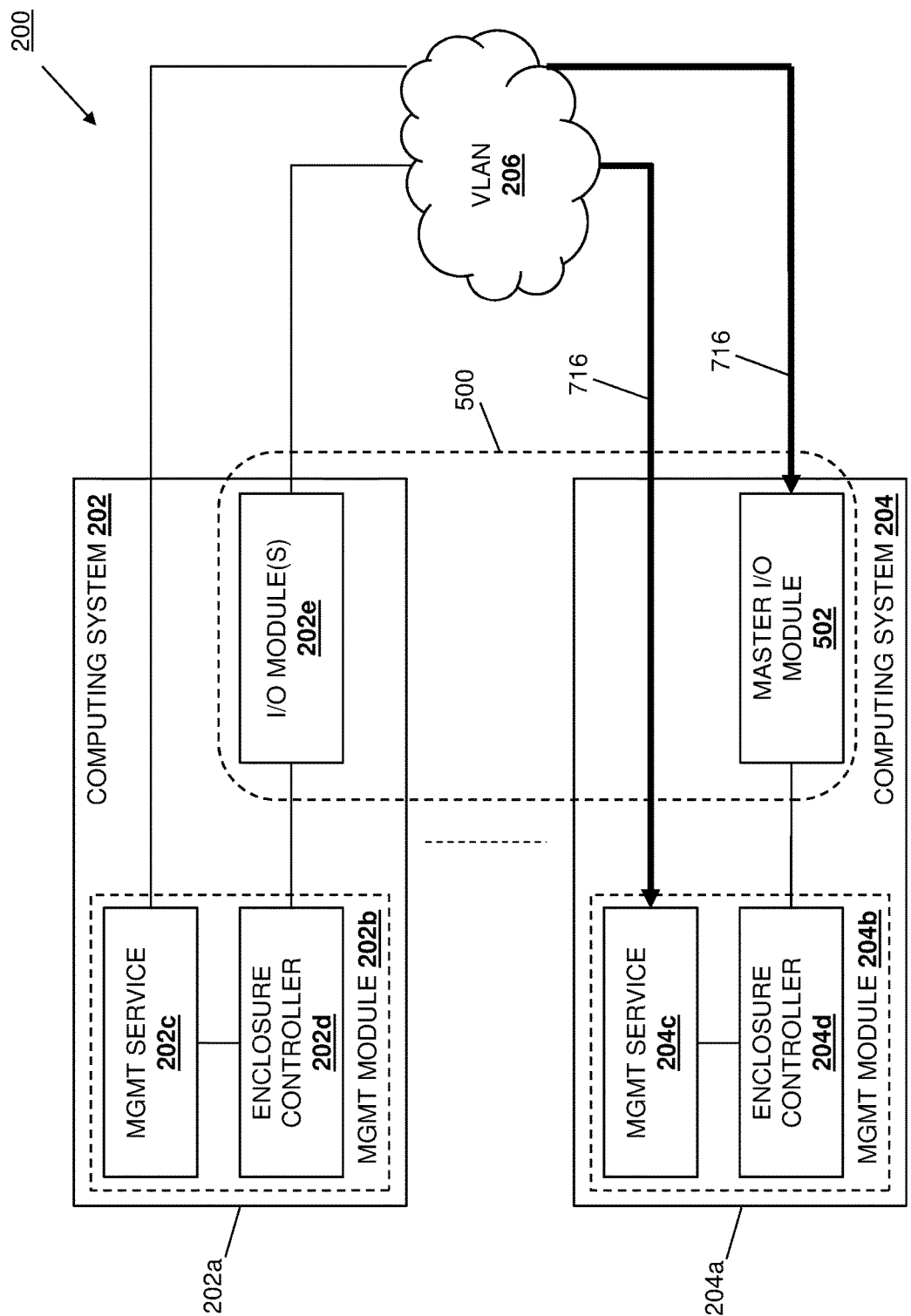

SECURED NETWORK MANAGEMENT DOMAIN ACCESS SYSTEM

BACKGROUND

The present disclosure relates generally to information handling systems, and more particularly to providing secure access to a network management domain provided for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided by a "modular" computing system in a chassis, which allows groups of modular computing systems to be utilized to form a logical chassis management domain that is often referred to as a Multi-Chassis Management (MCM) group. Within such MCM groups, a system management domain may be created to manage the modular computing systems in the MCM group, with a "lead" modular computing system operating to manage the "member" modular computing systems via the system management domain. Furthermore, each modular computing system may include one or more Input/Output (I/O) modules that are configured to provide a network management domain for that modular computing system. As discussed further below, the inventors of the present disclosure have developed systems and methods for synchronizing the network management domain with the system management domain provided for an MCM group to provide a single network management domain for the system management group, rather than multiple network management domains that result in different management access points for the networking fabric within the system management domain, and those systems and methods are described in U.S. patent application Ser. No. 16/731,946, filed on Dec. 31, 2019, the disclosure of which is incorporated herein in its entirety. However, in addition to the network management domain provided for the system management domain requiring high availability, access to such network management domains must be secured to prevent unauthorized access to the MCM group. Conventional MCM group configuration systems do not provide any means for securing communications between a system management domain and a network management domain provided for a single modular computing system, much less for a group of modular computing systems that have had their network management domain synchronized with their system management domain.

Accordingly, it would be desirable to provide a secured network management domain access system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a first management module that includes: an enclosure controller that is coupled via a first communication channel to each of at least one I/O module that is configured to provide network management domain, wherein the enclosure controller is configured to: retrieve master I/O module secured access information via the first communication channel from a master I/O module that is included in the at least one I/O module; and a first management service that is coupled to the enclosure controller via a second communication channel and to each of the at least one I/O module via a third communication channel, wherein the first management service is configured to: retrieve the master I/O module secured access information from the enclosure controller via the second communication channel; and perform validation operations with the master I/O module via the third communication channel such that the first management service may securely access the network management domain via the master I/O module.

BRIEF DESCRIPTION OF THE DRAWINGS

FIG. 7C is a schematic view illustrating an embodiment of the MCM group of FIG. 5 operating during the method of FIG. 3.

FIG. 7G is a schematic view illustrating an embodiment of the MCM group of FIG. 5 operating during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
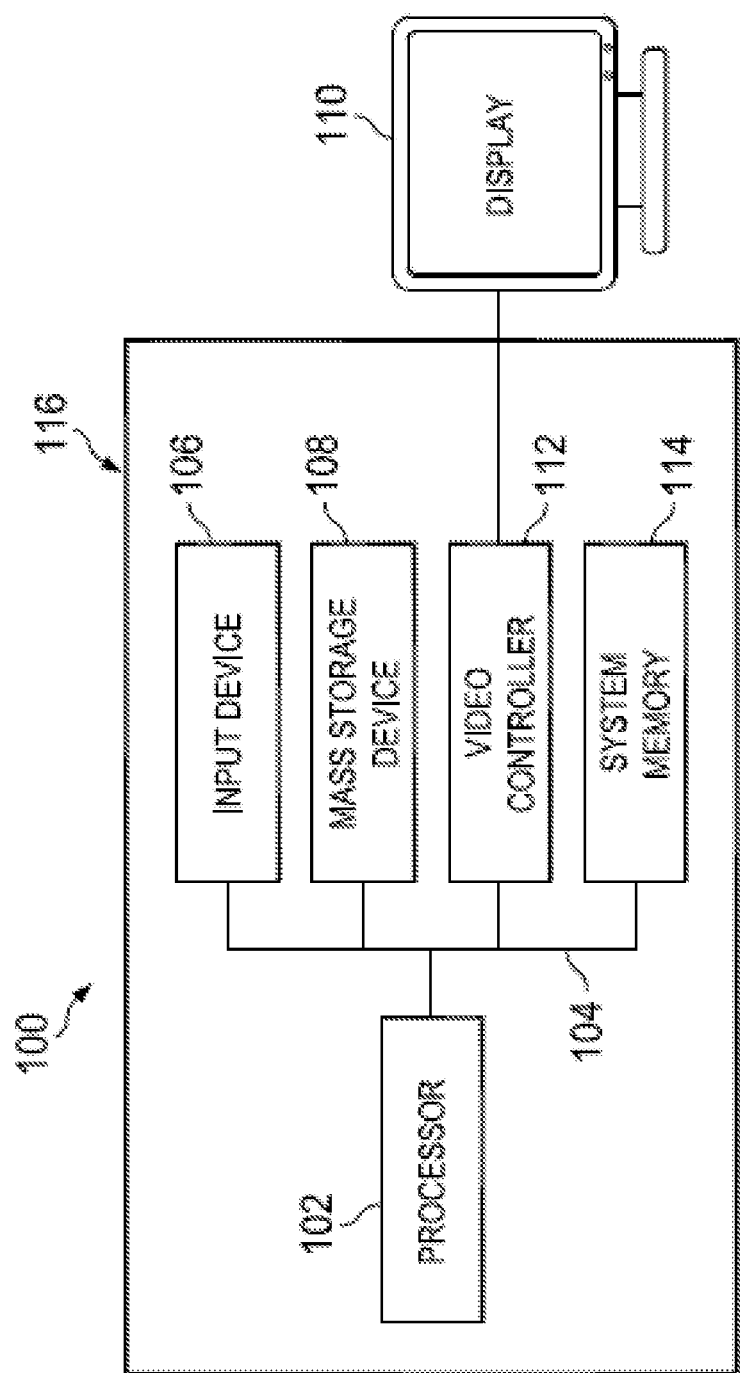
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
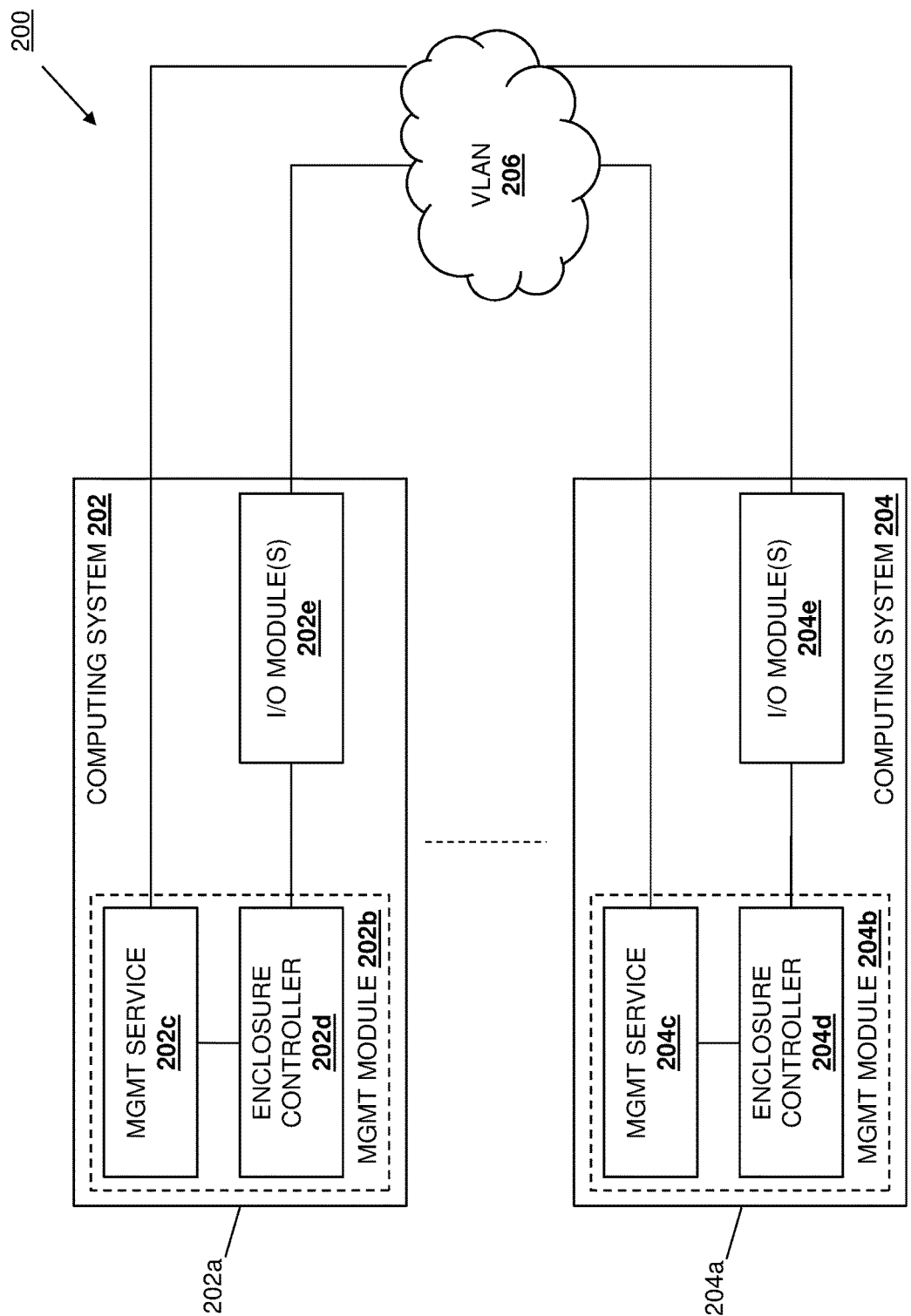
FIG. 2 is a schematic view illustrating an embodiment of a secure network management domain access system.

Referring now to FIG. 2, an embodiment of a secure network management domain access system 200 is illustrated. In the illustrated embodiment, the secure network management domain access system 200 incudes a plurality of computing systems 202 and up to 204. In an embodiment, any or all of the computing systems 202-204 may be provided by the IHS 100 discussed above with reference to FIG. 1, and/or may include some or all of the components of the IHS 100. In the specific examples discussed below, each of the computing systems are provided by a modular computing system in a respective chassis, with the module computing systems configurable in a manner that allows groups of the modular computing systems to be utilized to form a logical chassis management domain that is often referred to as a Multi-Chassis Management (MCM) group. However, while illustrated and discussed as modular computing systems, one of skill in the art in possession of the present disclosure will recognize that computing systems provided in the secure network management domain access system 200 may include any devices and/or systems that may be configured to operate similarly as the computing systems discussed below.

In the illustrated embodiment, each of the computing systems 202-204 includes a management module and a plurality of Input/Output (I/O) modules that are each coupled to a Virtual Local Area Network (VLAN) 208. In the specific examples discussed below, the VLAN 206 is provided by a private, inter-chassis VLAN, although one of skill in the art in possession of the present disclosure will appreciated that the VLAN 206 may be replaced with other networks while remaining within the scope of the present disclosure as well. As such, the computing system 202 includes a chassis 202*a* that may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management module 202*b* that is configured to perform the functionality of the management modules and/or computing systems discussed below.

In the specific example illustrated in FIG. 2, the chassis 202*a* houses a first processing subsystem and a first memory subsystem, with the first memory subsystem including instructions that, when executed by the first processing subsystem, cause the first processing subsystem to provide a management service 202*c* that is configured to perform the functionality of the management services and/or computing systems discussed below, and the chassis 202*a* also houses a second processing subsystem and a second memory subsystem, with the second memory subsystem including instructions that, when executed by the second processing subsystem, cause the second processing subsystem to provide an enclosure controller 202d that is configured to perform the functionality of the enclosure controllers and/or computing systems discussed below. In some embodiments, the management service 202c and the enclosure controller 202d (e.g., the first processing subsystem and the second processing subsystem discussed above) may be coupled together by a communication channel such as, for example, an Open Authorization (OAuth)-based secured communication channel. Furthermore, the chassis 202a may house one or more I/O module(s) 202e, with each of the I/O module(s) 202e coupled to the enclosure controller 202d by a communication channel such as for example, secure hardware bus communication channel. Further still, the chassis 202a may house a first communication subsystem that couples the management service 202c to the VLAN 206, and second communication subsystem(s) that couple the I/O module(s) 202e to the VLAN 206.

Similarly, the computing system 204 includes a chassis 204a that may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a management module 204b that is configured to perform the functionality of the management modules and/or computing systems discussed below. In the specific example illustrated in FIG. 2, the chassis 204a houses a first processing subsystem and a first memory subsystem, with the first memory subsystem including instructions that, when executed by the first processing subsystem, cause the first processing subsystem to provide a management service 204c that is configured to perform the functionality of the management services and/or computing systems discussed below, and the chassis 204a also houses a second processing subsystem and a second memory subsystem, with the second memory subsystem including instructions that, when executed by the second processing subsystem, cause the second processing subsystem to provide an enclosure controller 204d that is configured to perform the functionality of the enclosure controllers and/or computing systems discussed below.

In some embodiments, the management service 204c and the enclosure controller 204d (e.g., the first processing subsystem and the second processing subsystem discussed above) may be coupled together by a communication channel such as, for example, an Open Authorization (OAuth)-based secured communication channel. Furthermore, the chassis 204a may house one or more I/O module(s) 204e, with each of the I/O module(s) 204e coupled to the enclosure controller 204d by a communication channel such as for example, secure hardware bus communication channel. Further still, the chassis 204a may house a first communication subsystem that couples the management service 204c to the VLAN 206, and second communication subsystem(s) that couple the I/O module(s) 204e to the VLAN 206. However, while a specific secure network management domain access system 200 has been illustrated and described, one of skill in the art in possession of the present disclosure will recognize that the secure network management domain access system of the present disclosure may include a variety of components and component configurations while remaining within the scope of the present disclosure as well.

Figure 3:
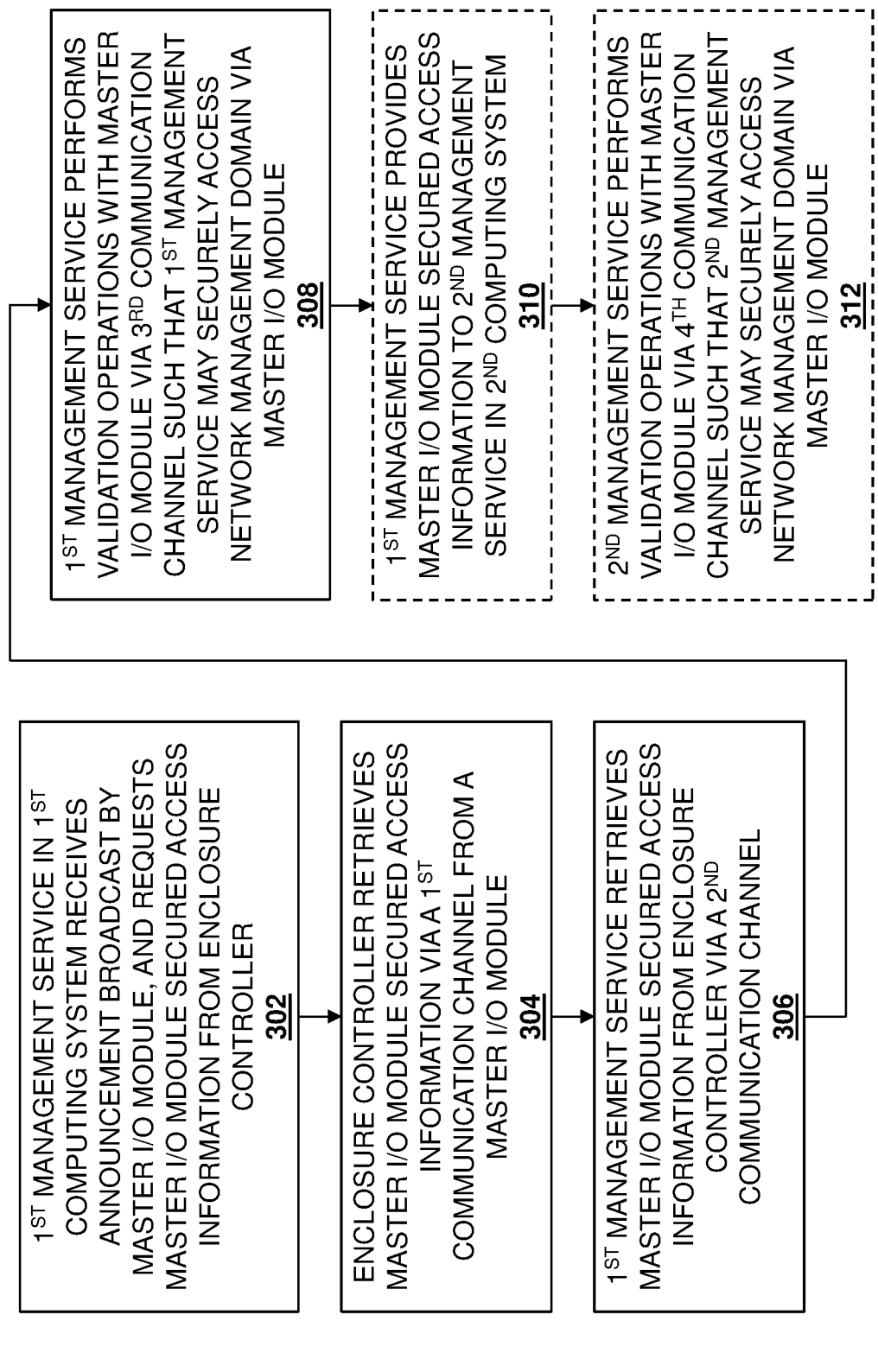
FIG. 3 is a flow chart illustrating an embodiment of a method for providing secure access to a network management domain.

Referring now to FIG. 3, an embodiment of a method 300 for providing secure access to a network management domain is illustrated. As discussed below, the systems and methods of the present disclosure provide for secure access to a network management domain provided for a system management domain/MCM group. For example, a computing system may include a chassis that houses I/O module(s) that are configured to provide a network management domain and that include a master I/O module. The computing system also includes a management module that is coupled to each of the I/O module(s). The management module includes an enclosure controller that coupled to each of the I/O module(s) via a first communication channel, with the enclosure controller operating to retrieve master I/O module secured access information from the master I/O module via the first communication channel. The management module also includes a management service coupled to the enclosure controller via a second communication channel and to each of the I/O module(s) via a third communication channel, with the management service retrieving the master I/O module secured access information from the enclosure controller via the second communication channel, and performing validation operations with the master I/O module via the third communication channel such that the management service may securely access the network management domain via the master I/O module. As such, following the validation operations, the management service in the computing system is provided secure access to the network management domain provided via the master I/O module. Furthermore, the management service may provide the master I/O module secure access information to management services in other computing systems that are part of its system management domain/MCM group to enable those management services to perform similar validation operations in order to securely access the network management domain via the master I/O module as well.

As discussed above, a subset of the inventors of the present disclosure have developed techniques for scaling of a network management domain provided with a system management domain for an MCM group by providing I/O modules in computing systems that will leave the network management domain that they are providing for their computing system, and join the network management domain provided with a system management domain for an MCM group when their computing system joins that MCM group. Those techniques are described in co-pending U.S. patent application Ser. No. 16/731,946, filed on Dec. 31, 2019, the disclosure of which is incorporated by reference. As such, in some embodiments, the MCM groups/system management domains described below that include multiple computing systems may be provided a network management domain that scales accordingly as computing systems join those MCM groups/system management domains, thus providing a single management access point for the networking fabric within the MCM group/system management domain.

Figure 4:
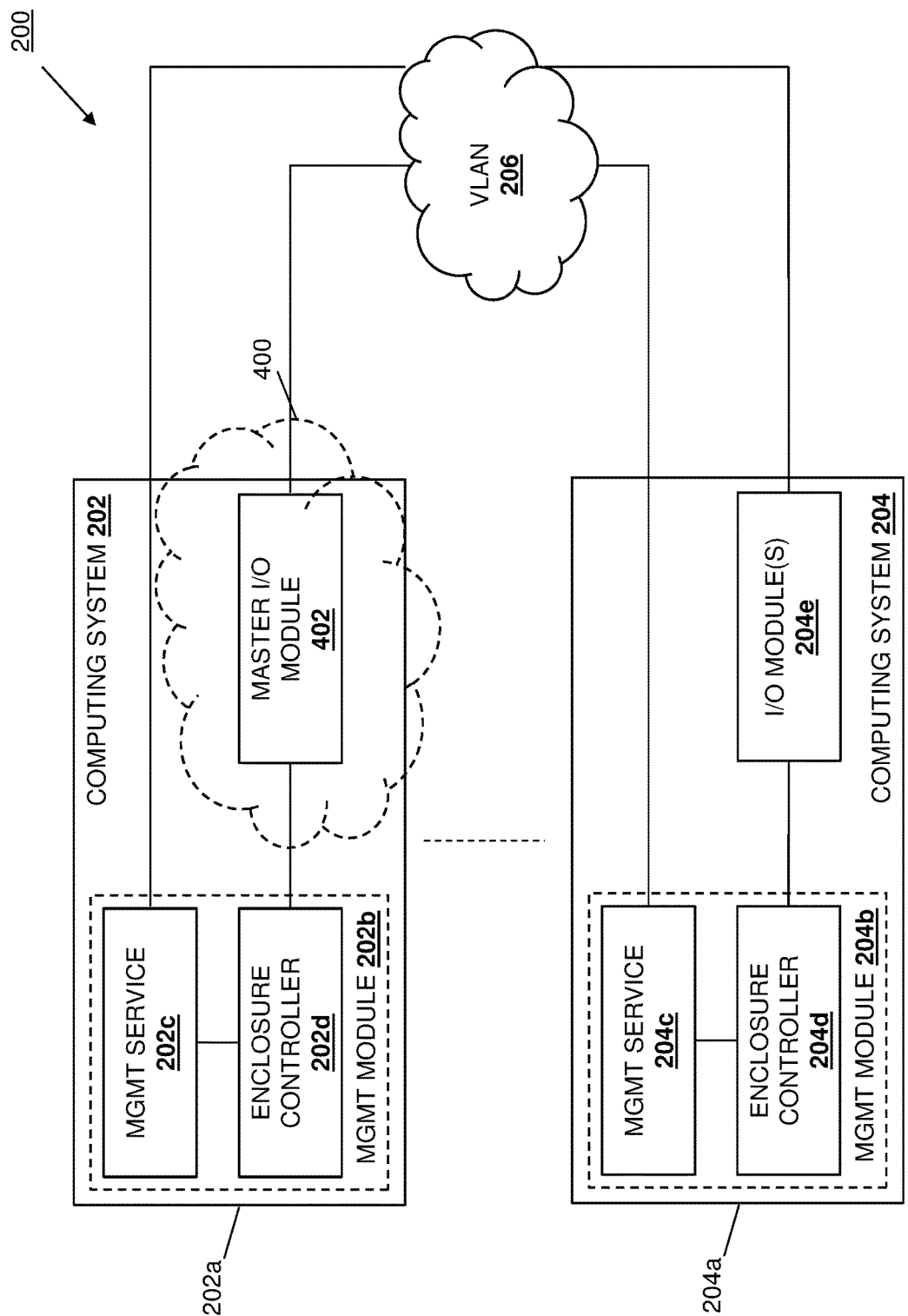
FIG. 4 is a schematic view illustrating an embodiment of a standalone computing system provided in the secure network management domain access system of FIG. 2 during the method of FIG. 3.

In some embodiments, during or prior to the method 300, a computing system in the secure network management domain access system 200 may operate in a "stand alone" role, and may belong to an MCM group that includes only that computing system, with its own system management domain and an associated network management domain that is provided by the I/O modules in that computing system. For example, FIG. 4 illustrates the computing system 202 operating in a stand alone role and, as such, that computing system 202 may belong to a system management domain/MCM group, with its I/O modules 202e providing a network management domain 400 for that system management domain/first MCM group. As will be appreciated by one of skill in the art in possession of the present disclosure, and as illustrated in FIG. 4 and discussed below, one of the I/O modules 202e in the computing system 202 operating in the stand alone role illustrated in FIG. 4 may be elected as a master I/O module 400 (which is illustrated in FIG. 4), while the remaining the I/O modules 202e in the computing system 202 operating as slave I/O modules (not illustrated in FIG. 4.) For example, the I/O modules 202e in the computing system 202 operating in the stand alone role may provide a network management cluster in which those I/O modules 202e elect the master I/O module 400 such that the remaining I/O modules operate as slave I/O modules, although other techniques for providing a master I/O module will fall within the scope of the present disclosure as well. While not discussed in detail below, one of skill in the art in possession of the present disclosure will appreciate that the computing system 204 may operate in a stand alone role in a similar manner while remaining within the scope of the present disclosure as well.

Figure 5:
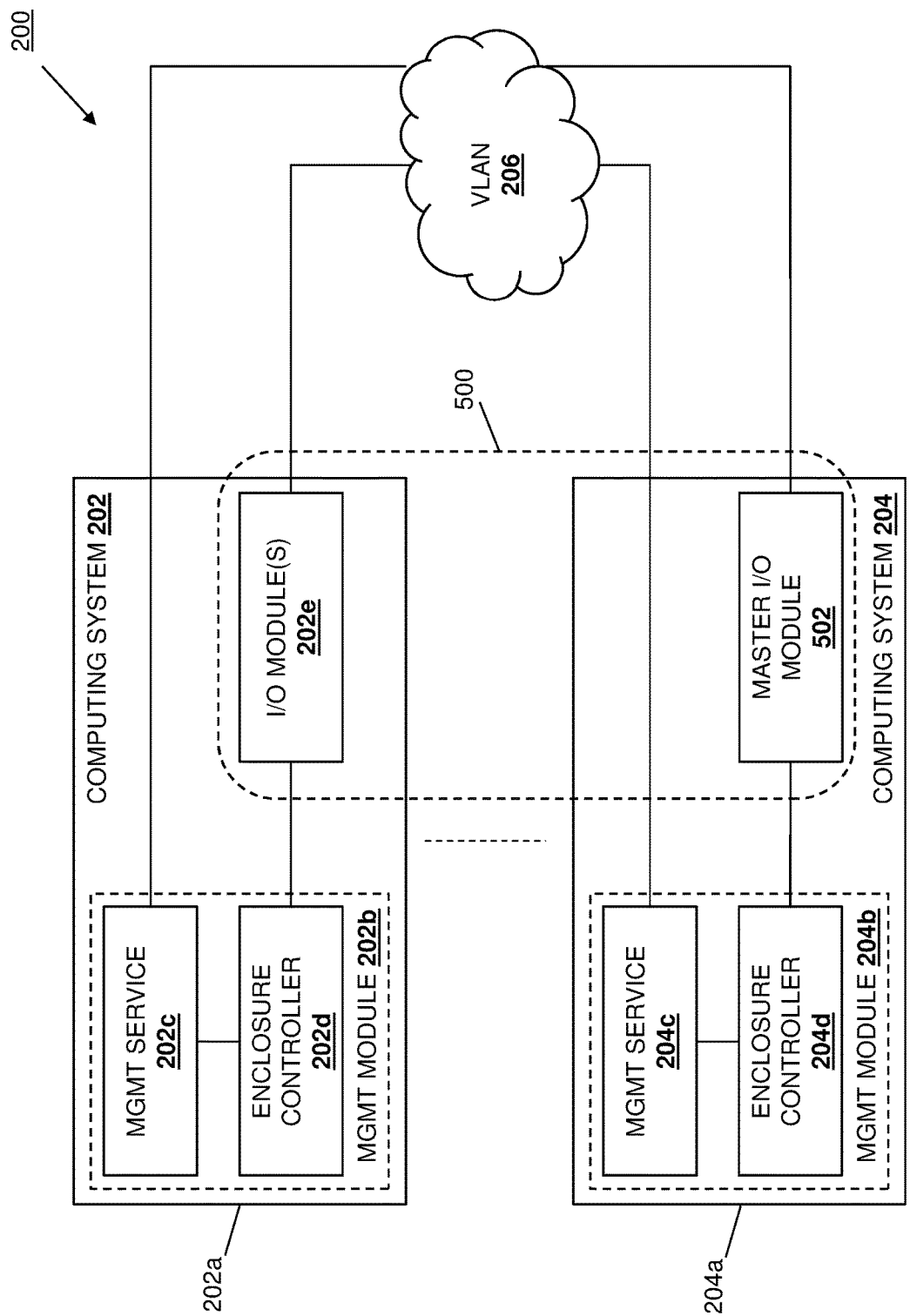
FIG. 5 is a schematic view illustrating an embodiment of a plurality of computing systems in an MCM group with a synchronized network management domain provided in the secure network management domain access system of FIG. 2 during the method of FIG. 3.

In other embodiments, during or prior to the method 300, multiple computing system may operate as an MCM group, with one of those computing systems (and its management module) operating in a "lead" role for the MCM group, and the other computing system(s) (and their management module(s)) operating in a "member" role for the MCM group. For example, FIG. 5 illustrates the computing systems 202 and 204 operating as part of the same MCM group with, in the examples below, the computing system 202/management module 202b operating in the lead role for the MCM group, and the computing system 204/management module 204b operating as in the member role for the MCM group. As such, the computing systems 202 and 204 may belong to the same system management domain/MCM group. As discussed above, a subset of the inventors of the present disclosure have developed techniques for scaling of a network management domain provided with a system management domain for an MCM group by providing I/O modules in computing systems that will leave the network management domain that they are providing for their computing system, and join the network management domain provided with a system management domain for an MCM group when their computing system joins that MCM group, and those techniques may have been applied when the computing system 204 joined the system management domain/MCM group including the computing system 202 in FIG. 5.

As such, in the examples below, the I/O modules 202e in the computing system 202 (operating in a lead role for the system management domain/MCM group in this example) and the I/O modules 204e in the computing system 204 (operating in a member role for the system management domain/MCM group in this example) provide a network management domain 500 for system management domain/MCM group to which the computing systems 202 and 204 belong. As will be appreciated by one of skill in the art in possession of the present disclosure, and as illustrated in FIG. 5 and discussed below, one of the I/O modules 204e in the computing system 204 operating in the member role illustrated in FIG. 5 may be elected as a master I/O module 502 (which is illustrated in FIG. 5), while the I/O modules 202e in the computing system 202 (illustrated in FIG. 5) and the remaining the I/O modules 204e in the computing system 204 (not illustrated in FIG. 5) may operate as slave I/O modules. For example, the I/O modules 202e in the computing system 202 operating in the lead role and the I/O modules 204e in the computing system 204 operating in the member role may provide a network management cluster in which those I/O modules 202e and 204e elect the master I/O module 502 such that the remaining I/O modules operate as slave I/O modules, although other techniques for providing a master I/O module will fall within the scope of the present disclosure as well.

As will be appreciated by one of skill in the art in possession of the present disclosure, one of the slave I/O modules may transition to operate as the master I/O module in either of the embodiments illustrated in FIGS. 4 and 5 in response to, for example, power cycling of the master I/O module, firmware upgrade operations by the master I/O module, removal of the master I/O module from its slot in the computing system 202, the creation of a new network fabric, the creation/deletion of an MCM group for which the master I/O module provides the network management domain, and/or in response to a variety of slave-to-master transition scenarios known in the art. Furthermore, as discussed below, master I/O modules provided according to the teachings of the present disclosure may be provided credential and certificate information for use in the method 300 below. As such, in response to such slave-to-master transition scenarios, the management service in computing systems operating in stand alone roles or lead/member roles for an MCM group may reinitiate election of a new master I/O module, which may include retrieving credential and certificate information for that master I/O module via a secured communication channel.

The method 300 begins at block 302 where a first management service in a first computing system receives an announcement broadcast by a master I/O module, and requests master I/O module secured access information from an enclosure controller. In an embodiment, at block 302, a master I/O module may operate to broadcast an announcement. For example, the announcement broadcast by the master I/O module at block 302 may be a multicast Domain Name System (mDNS) announcement that is broadcast via the VLAN 206, and may include a chassis service tag for the computing system that includes that master I/O module and that uniquely identifies that computing system, an universally unique MCM group identifier for the MCM group to which the computing system that includes that master I/O module belongs, an I/O module identification tag that uniquely identifies the master I/O module, and/or any other mDNS announcement information that would be apparent to one of skill in the art in possession of the present disclosure.

Figure 6A:
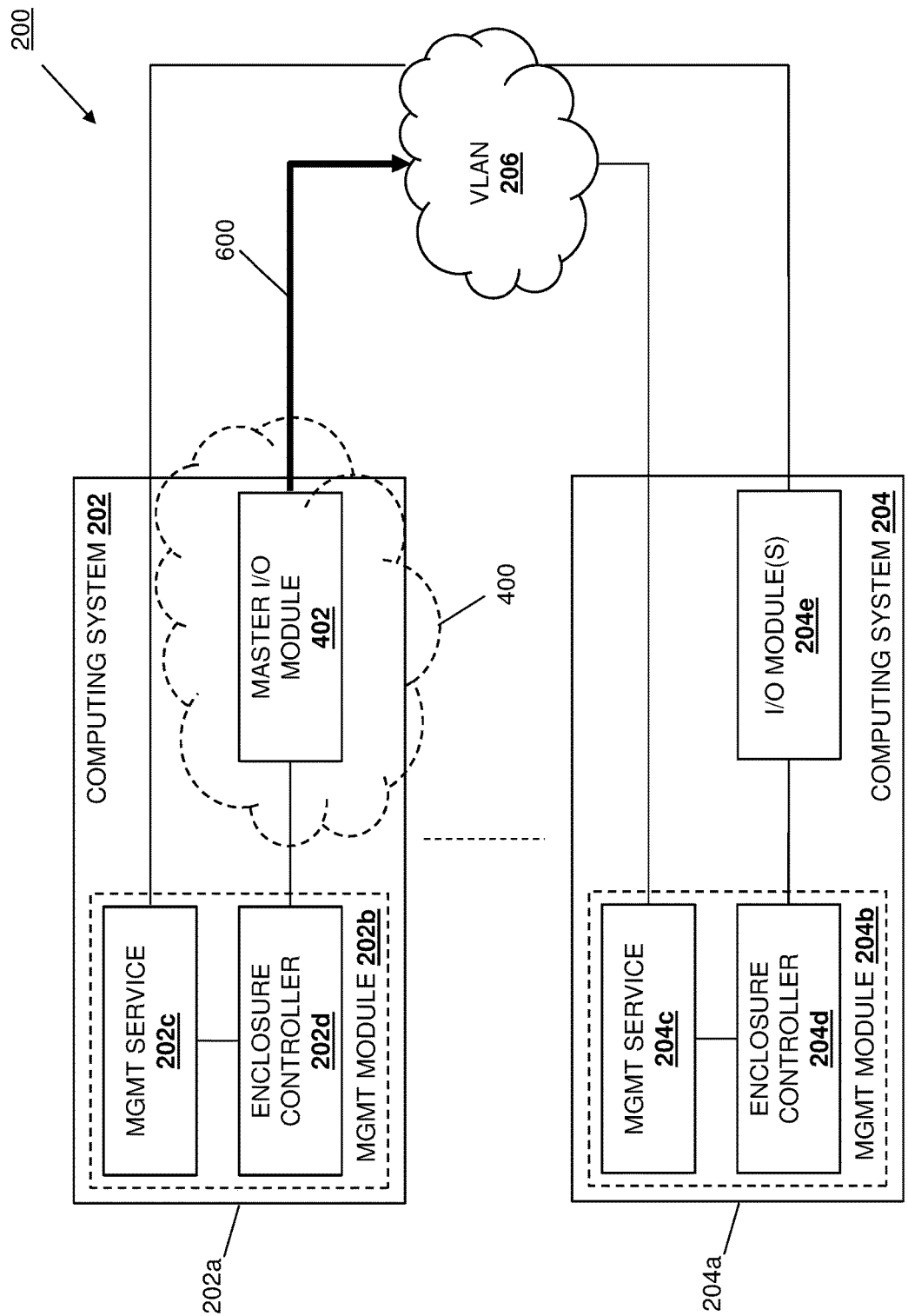
FIG. 6A is a schematic view illustrating an embodiment of the standalone computing system of FIG. 4 operating during the method of FIG. 3.
Figure 6B:
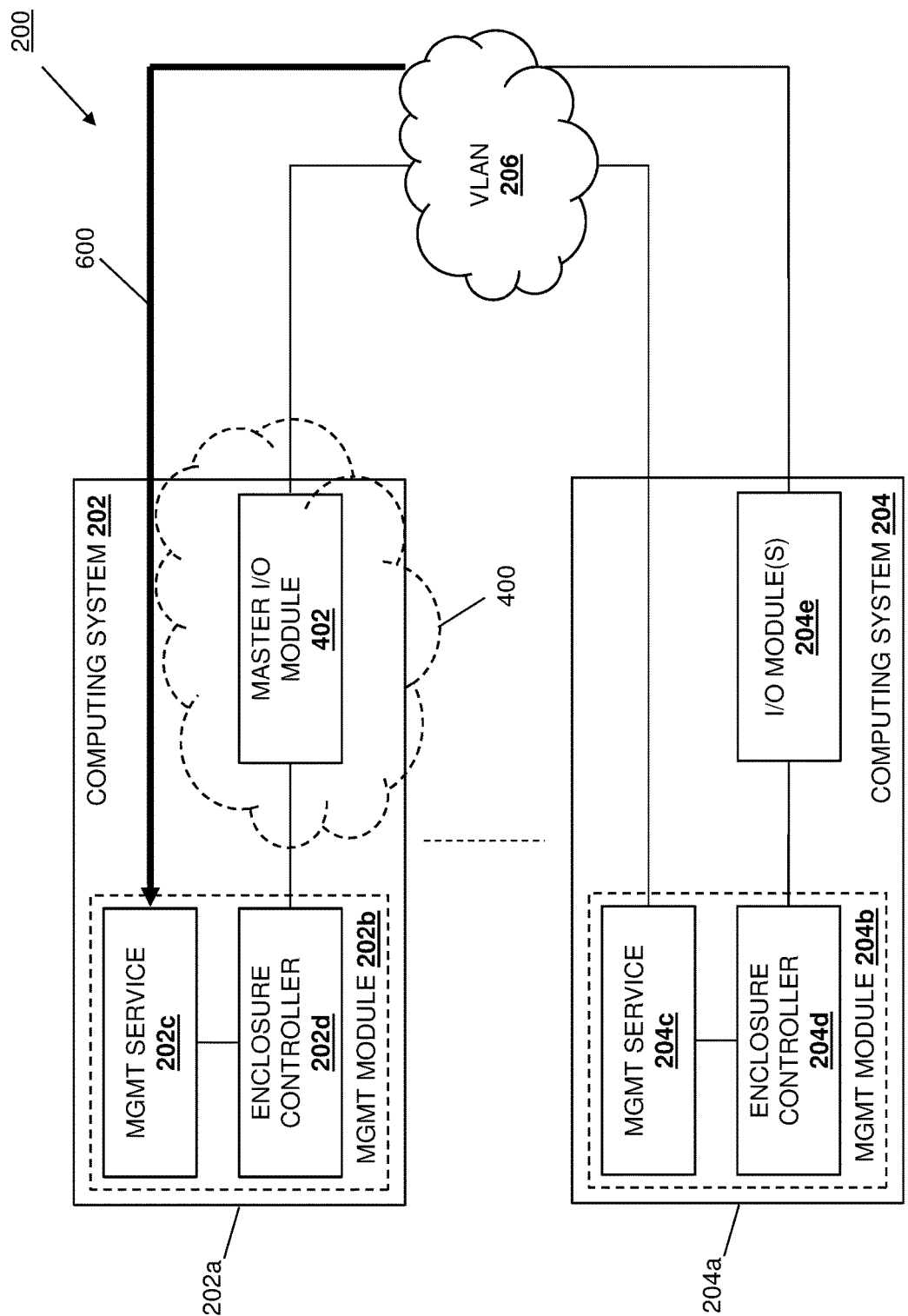
FIG. 6B is a schematic view illustrating an embodiment of the standalone computing system of FIG. 4 operating during the method of FIG. 3.
Figure 6C:
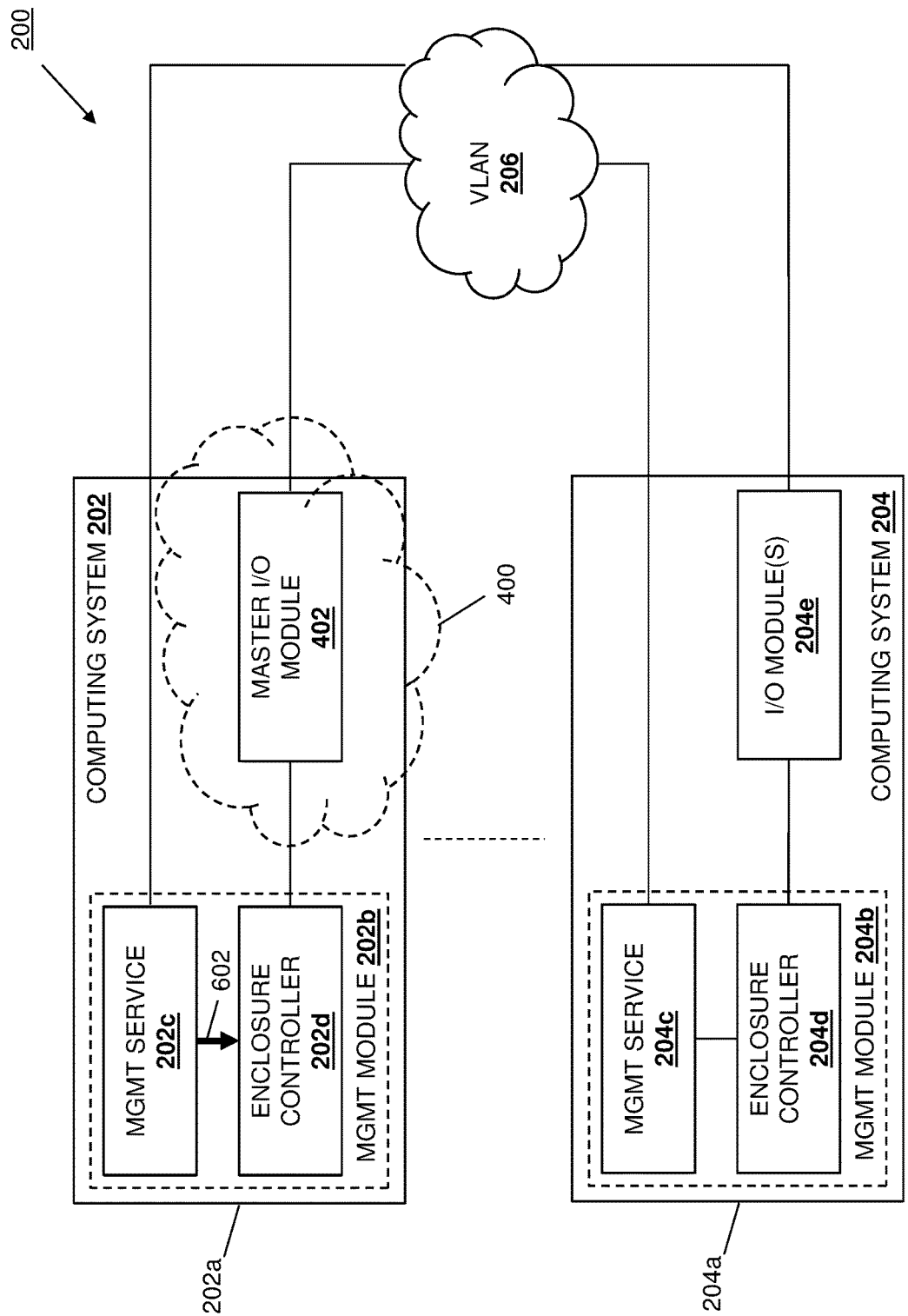
FIG. 6C is a schematic view illustrating an embodiment of the standalone computing system of FIG. 4 operating during the method of FIG. 3.

With reference to FIGS. 6A and 6B and the computing system 202 operating in the stand alone role in FIG. 4, at block 302 the master I/O module 402 may broadcast an announcement 600 via the VLAN 206 such that the announcement 600 is received by the management service 202c in the management module 202b in the computing system 202. As illustrated in FIG. 6C, in response to receiving the announcement 600, the management service 202c in the management module 202b in the computing system 202 may transmit a request 602 to the enclosure controller 202d in the management module 202b in the computing system 202 to retrieve master I/O module secured access information.

Figure 7A:
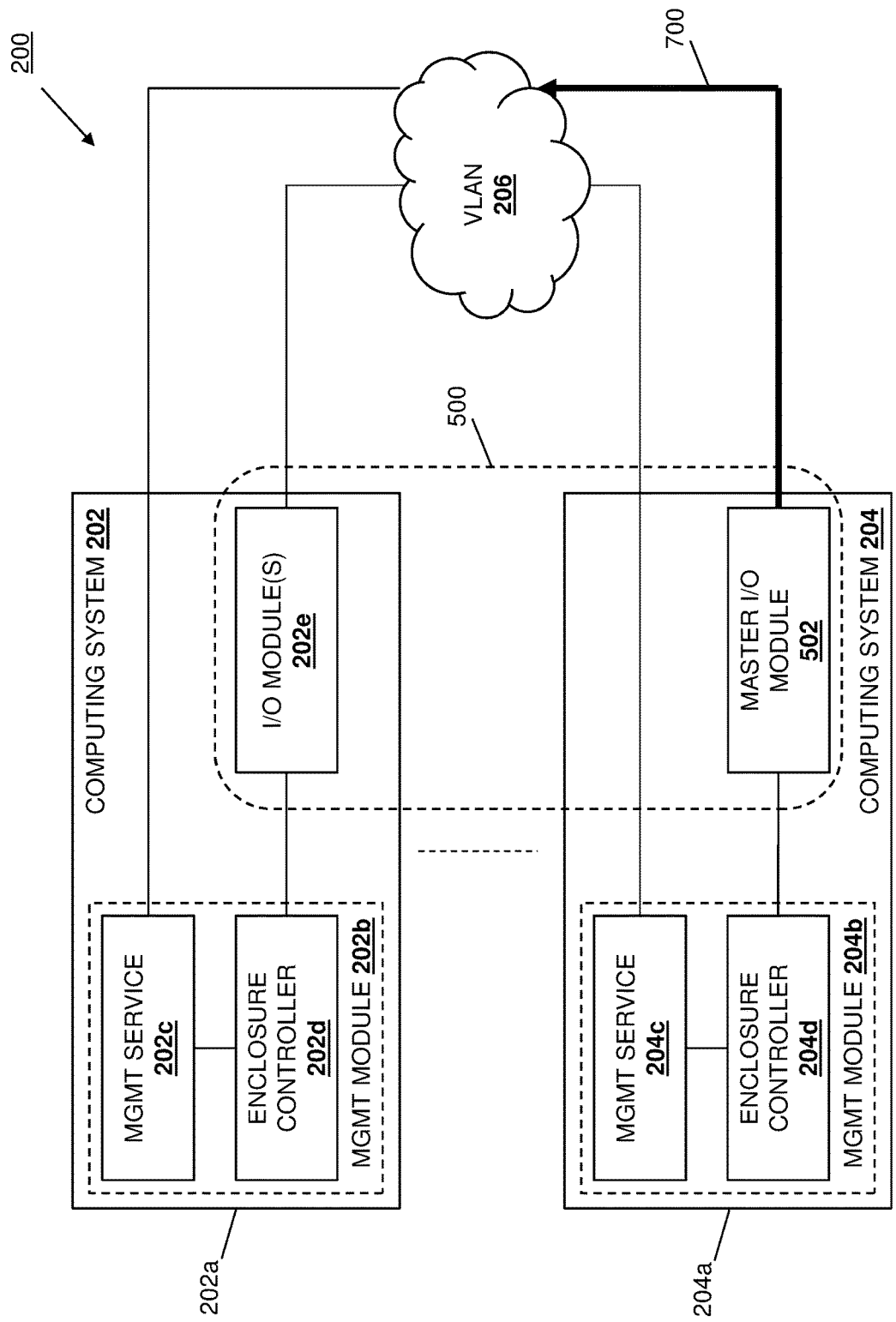
FIG. 7A is a schematic view illustrating an embodiment of the MCM group of FIG. 5 operating during the method of FIG. 3.
Figure 7B:
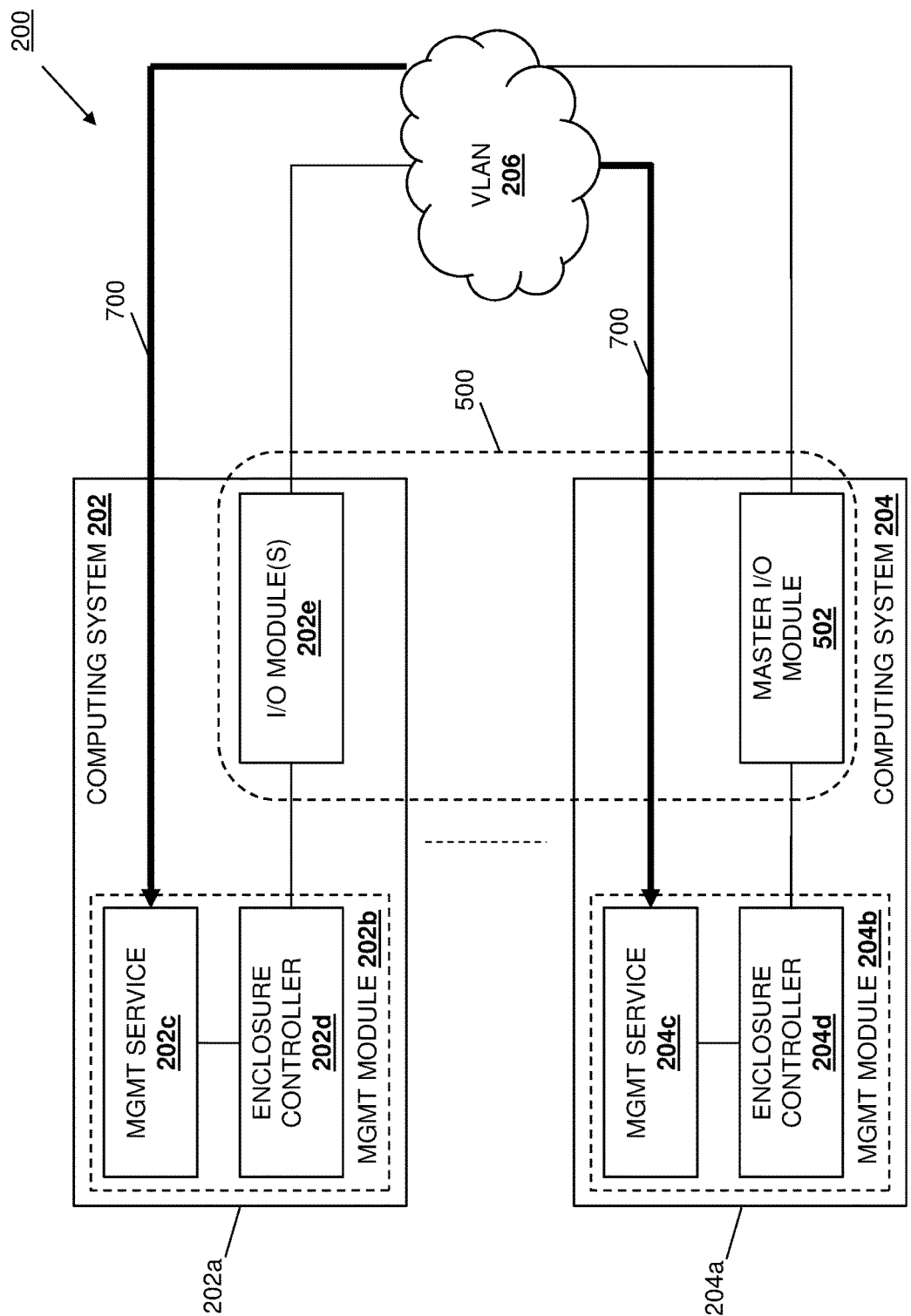
FIG. 7B is a schematic view illustrating an embodiment of the MCM group of FIG. 5 operating during the method of FIG. 3.

With reference to FIGS. 7A and 7B and the computing systems 202 and 204 that are part of the same MCM group in FIG. 5, at block 302 the master I/O module 502 may broadcast an announcement 700 via the VLAN 206 such that the announcement 700 is received by the management service 202c in the management module 202b in the computing system 202, as well as the management service 204c in the management module 204b in the computing system 204. As illustrated in FIG. 7C, in response to receiving the announcement 700, the management service 204c in the management module 204b in the computing system 204 may transmit a request 702 to the enclosure controller 204d in the management module 204b in the computing system 204 to retrieve master I/O module secured access information. Furthermore, as also illustrated in FIG. 7C, in response to receiving the announcement 700, the management service 202c in the management module 202b in the computing system 202 may transmit a request 702 to the enclosure controller 202d in the management module 202b in the computing system 202 to retrieve master I/O module credentials, master I/O module certificate information, and/or other information that would be apparent to one of skill in the art in possession of the present disclosure.

The method 300 then proceeds to block 304 where an enclosure controller retrieves master I/O module secured access information via a first communication channel from the master I/O module. In an embodiment, at block 304 and in response to receiving the request for the master I/O module secured access information, the enclosure controller in the management module in the computing system will retrieve that master I/O module secured access information from the master I/O module via a first communication channel. As discussed above, the first communication channel between the enclosure controller and the master I/O module may be a secure hardware bus communication channel.

Figure 6D:
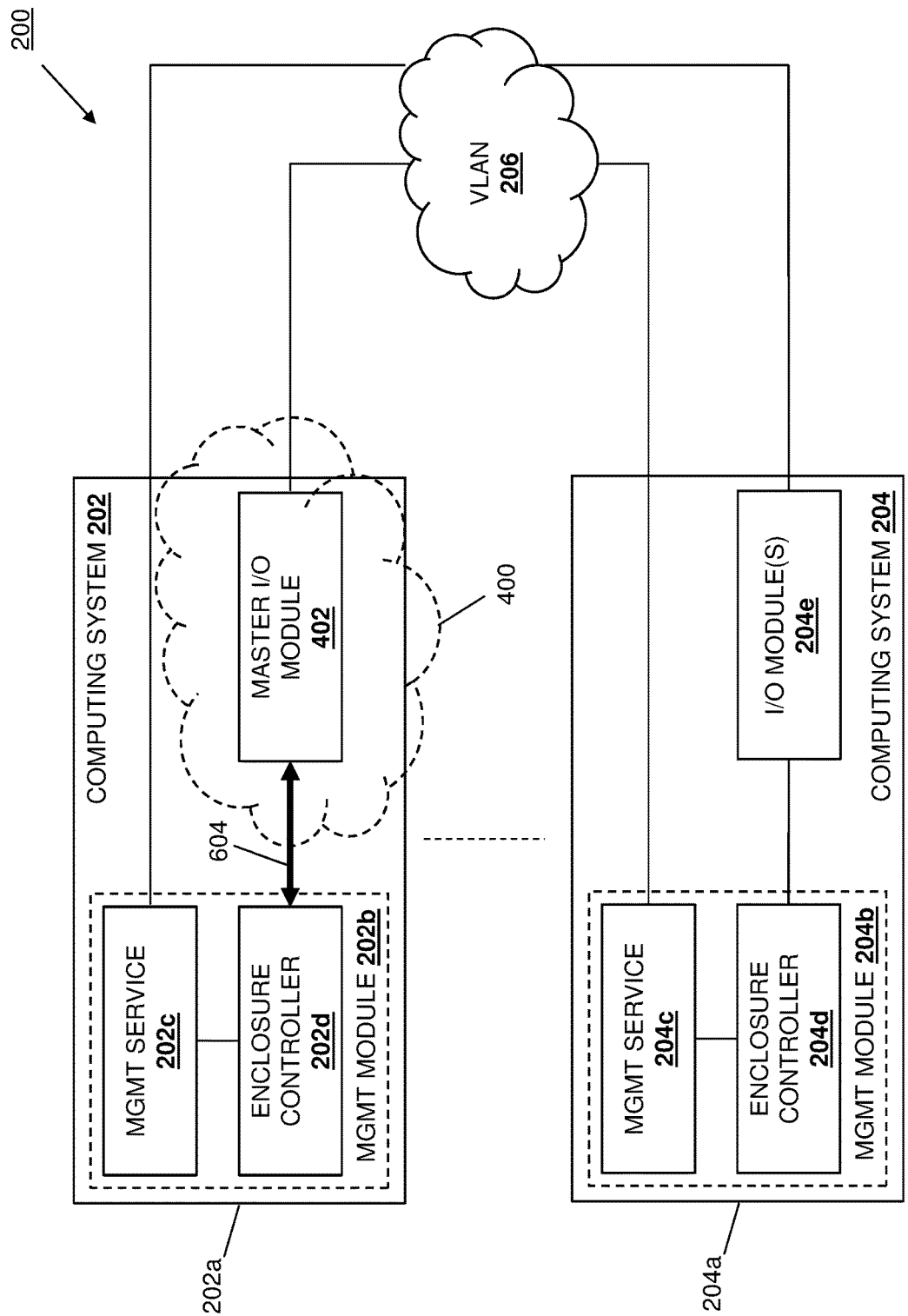
FIG. 6D is a schematic view illustrating an embodiment of the standalone computing system of FIG. 4 operating during the method of FIG. 3.

With reference to FIG. 6D and the computing system 202 operating in the stand alone role in FIG. 4, at block 304 the enclosure controller 202d in the management module 202b in the computing system 202 may perform retrieval operations 604 to retrieve master I/O module secured access information from the master I/O module 402 via a secure hardware bus communication channel (e.g., via a call to the master I/O module over a secured internal chassis hardware bus communication.) In an embodiment, the master I/O module secured access information may include internal credentials for the master I/O module 402, certificate information (e.g., Secure Socket Layer (SSL) certification information) for the master I/O module 402, and/or any other master I/O module secured access information that would be apparent to one of skill in the art in possession of the present disclosure.

Figure 7D:
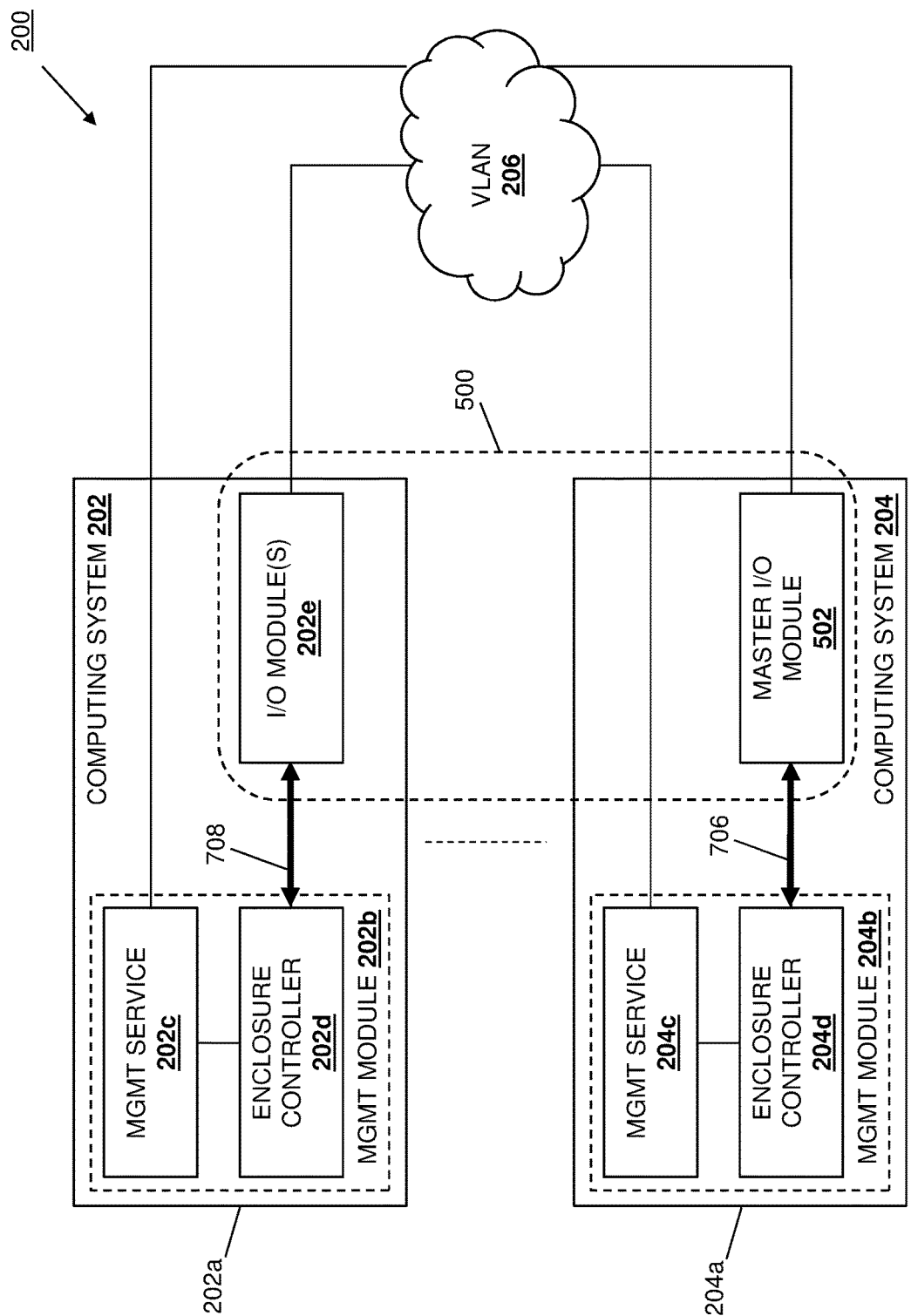
FIG. 7D is a schematic view illustrating an embodiment of the MCM group of FIG. 5 operating during the method of FIG. 3.

With reference to FIG. 7D and the computing systems 202 and 204 that are part of the same MCM group in FIG. 5, at block 304 the enclosure controller 204d in the management module 204b in the computing system 204 may perform retrieval operations 706 to retrieve master I/O module secured access information from the master I/O module 502 via a secure hardware bus communication channel (e.g., via a call to the master I/O module over a secured internal chassis hardware bus communication.) In an embodiment, the master I/O module secured access information may include internal credentials for the master I/O module 502, certificate information (e.g., Secure Socket Layer (SSL) certification information) for the master I/O module 502, and/or any other master I/O module secured access information that would be apparent to one of skill in the art in possession of the present disclosure. Furthermore, as also illustrated in FIG. 7D, at block 304 the enclosure controller 202d in the management module 202b in the computing system 202 may perform retrieval operations 708 to retrieve I/O module credentials, I/O module certificate information, and/or other information that would be apparent to one of skill in the art in possession of the present disclosure from the I/O module(s) 202e via a secure hardware bus communication channel (e.g., via a call to the I/O module(s) 202e over a secured internal chassis hardware bus communication.)

The method 300 then proceeds to block 306 where the first management service retrieves master I/O module secured access information from the enclosure controller via a second communication channel. In an embodiment, at block 306 and following the enclosure controller that is part of its management module retrieving the master I/O module secured access information, the management service in that management module may retrieve the master I/O module secured access information from that enclosure controller. As discussed above, the second communication channel between the management service and the enclosure controller in a management module may be an OAuth-based secured communication channel.

Figure 6E:
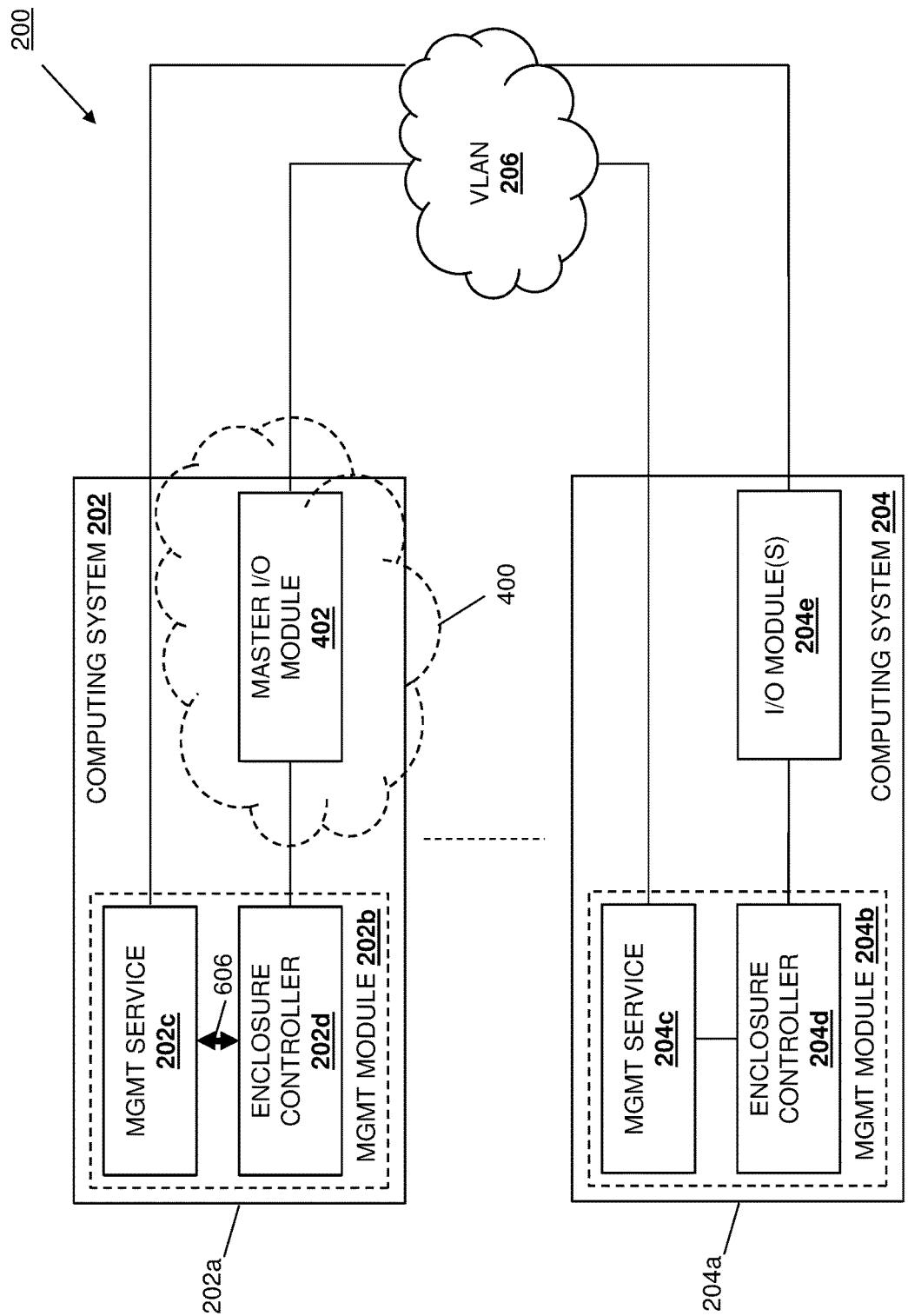
FIG. 6E is a schematic view illustrating an embodiment of the standalone computing system of FIG. 4 operating during the method of FIG. 3.

With reference to FIG. 6E and the computing system 202 operating in the stand alone role in FIG. 4, at block 306 the management service 202c in the management module 202b in the computing system 202 may perform retrieval operations 606 to retrieve the master I/O module secured access information from the enclosure controller 202d in the management module 202b in the computing system 202 via an OAuth-based secured communication channel (e.g., via an OAuth-based secured communication provided according to the REDFISH® standard.) For example, based on information included in the announcement 600 broadcast by the master I/O module 402 (e.g., a chassis service tag for the computing system 202 that includes the master I/O module 402 and that uniquely identifies that computing system 202), the management service 202c in the management module 202b in the computing system 202 may operate to perform the retrieval operations 606 with the enclosure controller 202d in the management module 202b in the computing system 202 identified in that announcement 600.

Figure 7E:
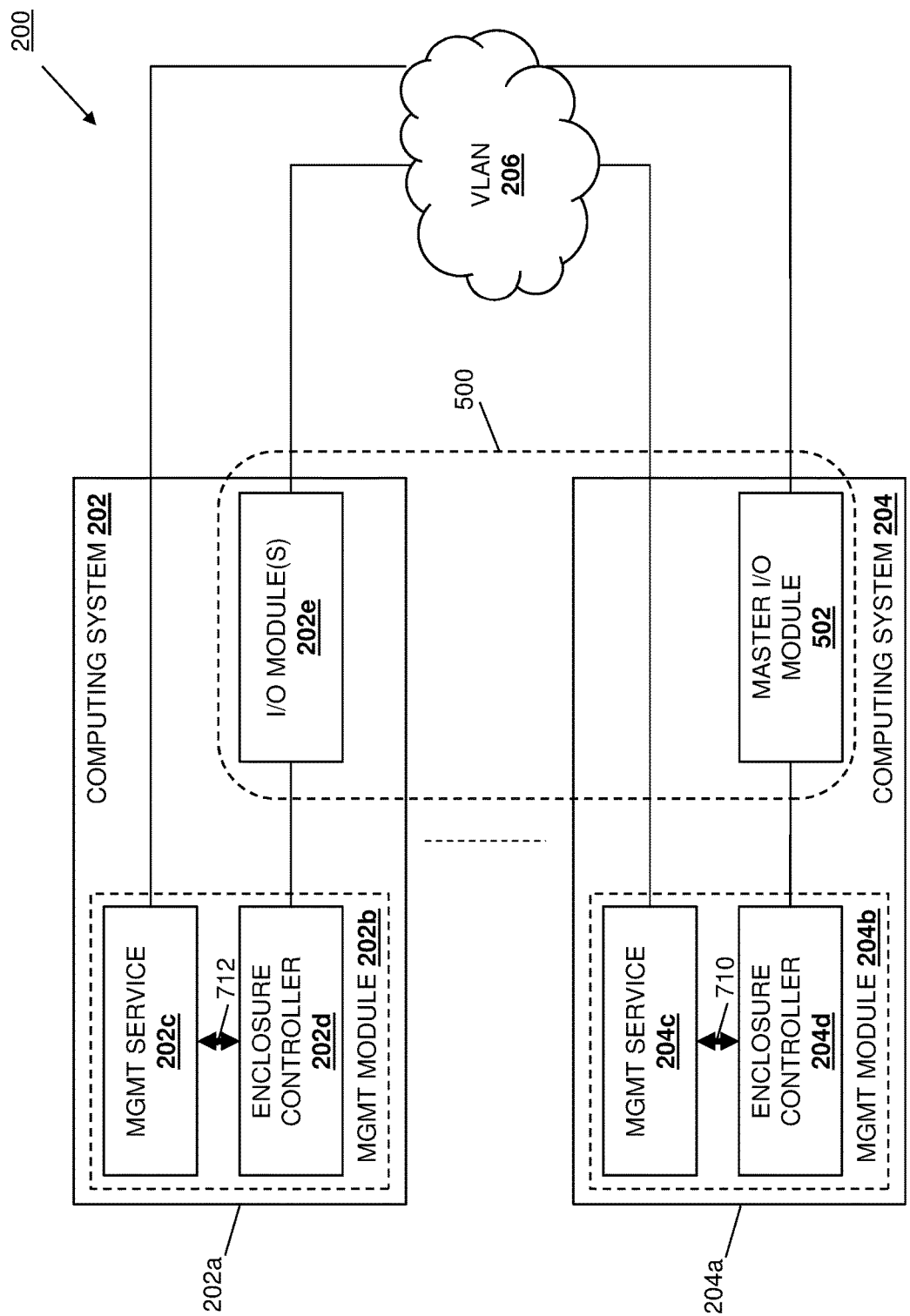
FIG. 7E is a schematic view illustrating an embodiment of the MCM group of FIG. 5 operating during the method of FIG. 3.

With reference to FIG. 7E and the computing systems 202 and 204 that are part of the same MCM group in FIG. 5, at block 306 the management service 204c in the management module 204b in the computing system 204 may perform retrieval operations 710 to retrieve the master I/O module secured access information from the enclosure controller 204d in the management module 204b in the computing system 204 via an OAuth-based secured communication channel (e.g., via an OAuth-based secured communication provided according to the REDFISH® standard.). Furthermore, as also illustrated in FIG. 7E, at block 306 the management service 202c in the management module 202b in the computing system 202 may perform retrieval operations 712 to retrieve the I/O module credentials, I/O module certificate information, and/or other information that would be apparent to one of skill in the art in possession of the present disclosure from the enclosure controller 202d in the management module 202b in the computing system 202 via an OAuth-based secured communication channel (e.g., via an OAuth-based secured communication provided according to the REDFISH® standard.) As will be appreciated by one of skill in the art in possession of the present disclosure, the management service 202c in the computing system 202 may identify the management service 204c in the computing system 204 via the chassis service tag in the announcement 700 provided by the master I/O module 502 in order to obtain the master I/O module secured access information for the master I/O module 502 via the enclosure controller 204d in the computing system 204 at block 710.

The method 300 then proceeds to block 308 where the first management service performs validation operations with the master I/O module via a third communication channel such that the first management service may securely access the network management domain via the master I/O module. In an embodiment, at block 308 and following the management service retrieving the master I/O module secured access information, the management service may use that master I/O module secured access information to perform validation operations with the master I/O module via a third communication channel. As discussed above, the third communication channel between the management service and the I/O module may be provided via the VLAN 206 (e.g., an internal management VLAN.)

Figure 6F:
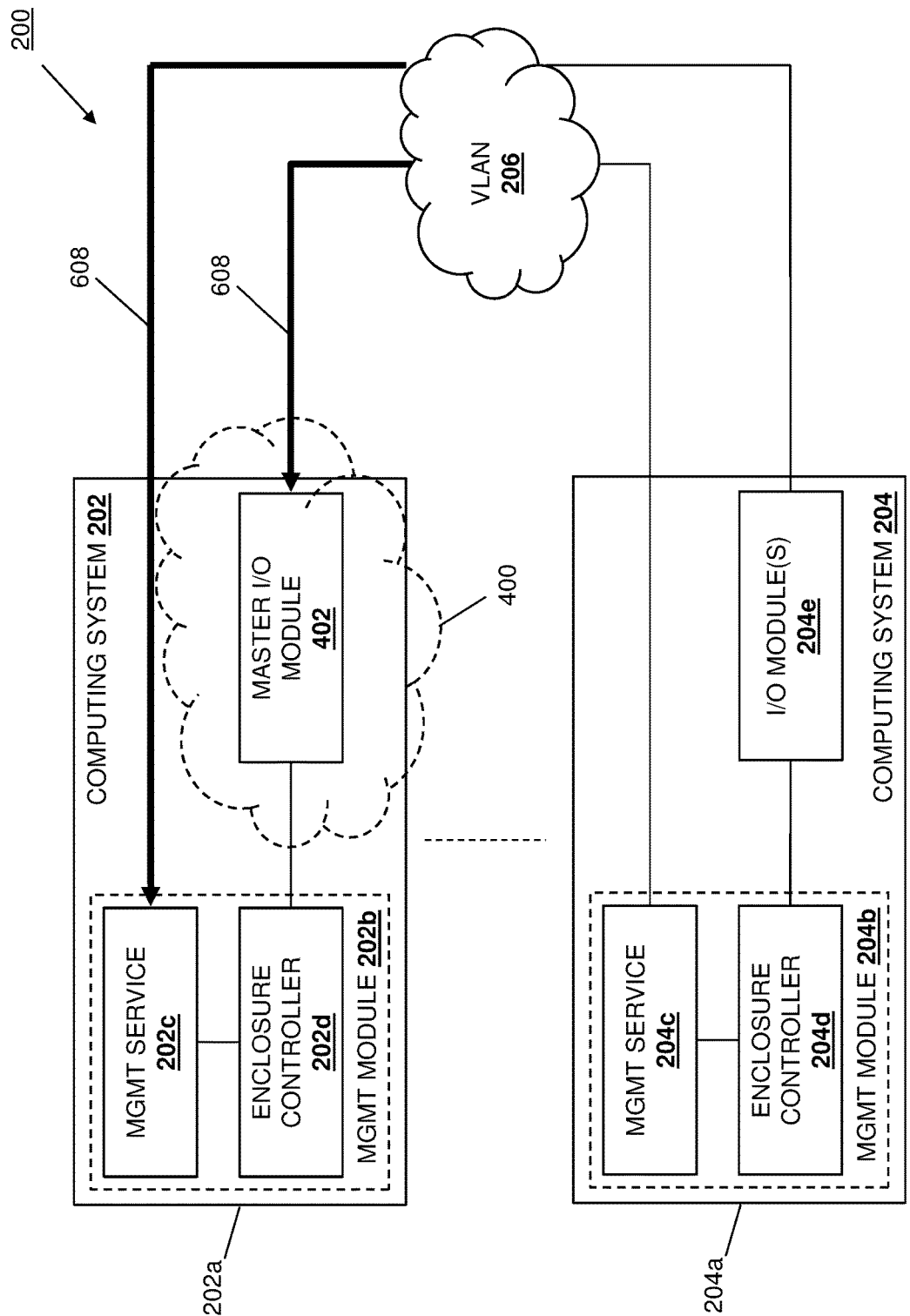
FIG. 6F is a schematic view illustrating an embodiment of the standalone computing system of FIG. 4 operating during the method of FIG. 3.

With reference to FIG. 6f and the computing system 202 operating in the stand alone role in FIG. 4, at block 308 the management service 202c in the management module 202b in the computing system 202 may perform validation operations 608 with the master I/O module 402 over the VLAN 206. One of skill in the art in possession of the present disclosure will recognize that a variety of validation operations may be performed between a management service and a master I/O module using credential information, certificate information, and/or other master I/O module secured access information while remaining within the scope of the present disclosure. Furthermore, one of skill in the art in possession of the present disclosure will appreciate that, in response to successful validation operations, validation information will be stored in the computing system 202 in association with the management service 202c, and used for future requests by the management service 202c to the master I/O module 402 in order to allow the management service 202c to securely access the network management domain 400 provided by the master I/O module 402 for the system management domain/MCM group to which the computing system 202 belongs (e.g., via the master I/O module 402 operating the authenticate all incoming requests from the management service 202c based on its internal credentials and certificates to ensure that the management service 202c is an authorized/legitimate management service.)

With reference to FIG. 7G and the computing systems 202 and 204 that are part of the same MCM group in FIG. 5, at block 308 the management service 204c in the management module 204b in the computing system 204 may perform validation operations 716 with the master I/O module 502 over the VLAN 206. One of skill in the art in possession of the present disclosure will recognize that a variety of validation operations may be performed between a management service and a master I/O module using credential information, certificate information, and/or other master I/O module secured access information while remaining within the scope of the present disclosure. Furthermore, one of skill in the art in possession of the present disclosure will appreciate that, in response to successful validation operations, validation information will be stored in the computing system 204 in association with the management service 204c, and used for future requests by the management service 204c to the master I/O module 502 in order to allow the management service 204c to securely access the network management domain 500 provided by the master I/O module 502 for the system management domain/MCM group to which the computing system 204 belongs (e.g., via the master I/O module 502 operating the authenticate all incoming requests from the management service 204c based on its internal credentials and certificates to ensure that the management service 204c is an authorized/legitimate management service.)

Figure 7F:
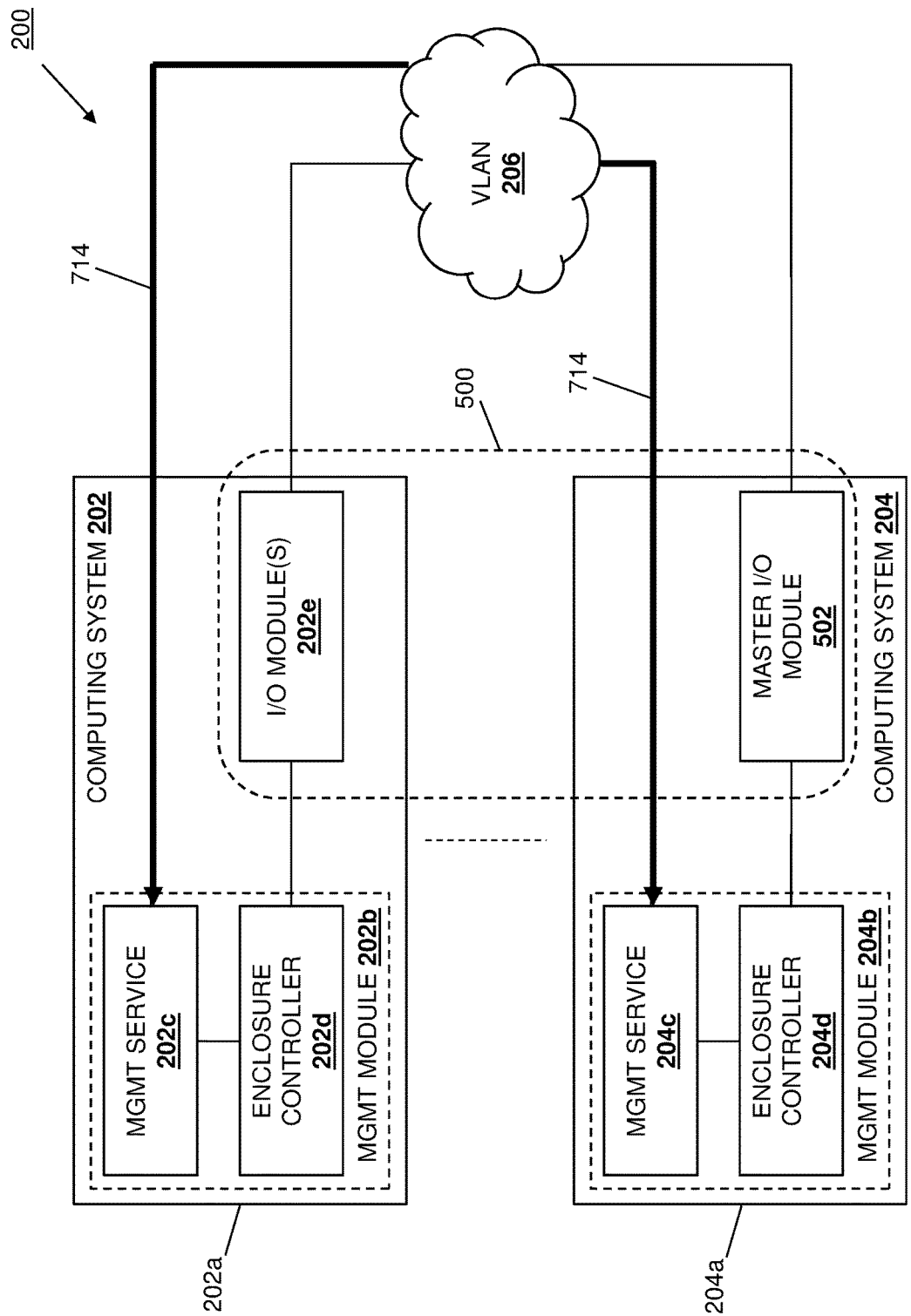
FIG. 7F is a schematic view illustrating an embodiment of the MCM group of FIG. 5 operating during the method of FIG. 3.

The method 300 may then proceed to optional block 310 where the first management service provides the master I/O module secured access information to a second management service in a second computing system. In an embodiment, at optional block 310, the management service that retrieved the master I/O module secured access information from the master I/O module may provide that master I/O module secured access information to a different management service in a different computing system/chassis. For example, with reference to FIG. 7F and the computing systems 202 and 204 that are part of the same MCM group in FIG. 5, the management service 204c in the management module 204b in the computing system 204 that retrieved the master I/O module secured access information from the master I/O module 502 may perform master I/O module secured access information sharing operations 714 via the VLAN 206 to transmit that master I/O module secured access information to the management service 202c in the management module 202b in the computing system 202.

The method 300 may then proceed to optional block 312 where the second management service performs validation operations with the master I/O module via a fourth communication channel such that the second management service may securely access the network management domain via the master I/O module. In an embodiment, at optional block 312 and following a second management service receiving the master I/O module secured access information from a first management service, that second management service may use that master I/O module secured access information to perform validation operations with the master I/O module via a fourth communication channel. As discussed above, the fourth communication channel between the management service and the I/O module may be provided via the VLAN 206 (e.g., an internal management VLAN.)

Figure 7H:
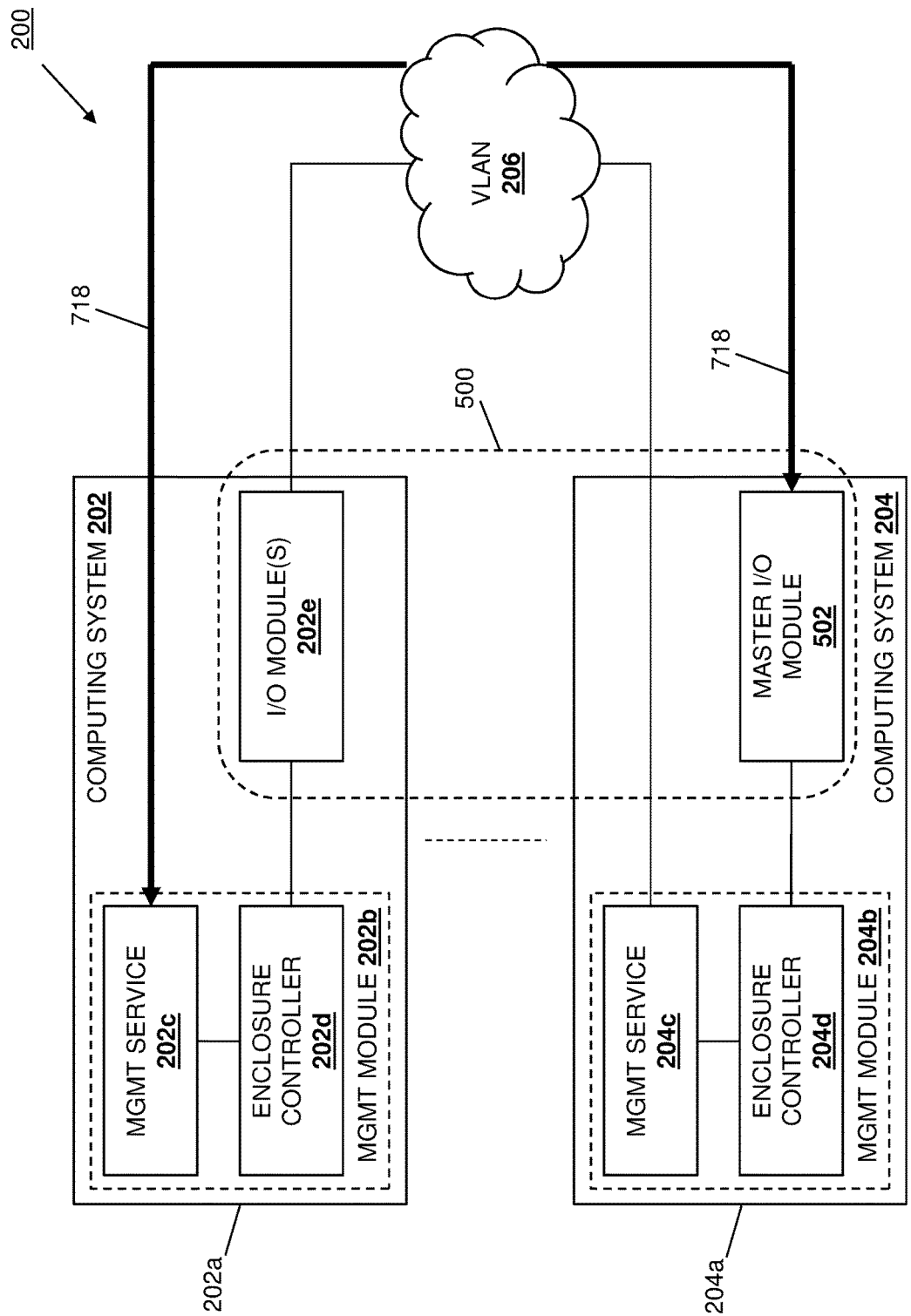
FIG. 7H is a schematic view illustrating an embodiment of the MCM group of FIG. 5 operating during the method of FIG. 3.

With reference to FIG. 7H and the computing systems 202 and 204 that are part of the same MCM group in FIG. 5, at block 308 the management service 202c in the management module 202b in the computing system 202 may perform validation operations 718 with the master I/O module 502 over the VLAN 206. One of skill in the art in possession of the present disclosure will recognize that a variety of validation operations may be performed between a management service and a master I/O module using credential information, certificate information, and/or other master I/O module secured access information while remaining within the scope of the present disclosure. Furthermore, one of skill in the art in possession of the present disclosure will appreciate that, in response to successful validation operations, validation information will be stored in the computing system 202 in association with the management service 202c, and used for future requests by the management service 202c to the master I/O module 502 in order to allow the management service 202c to securely access the network management domain 500 provided by the master I/O module 502 for the system management domain/MCM group to which the computing system 202 belongs (e.g., via the master I/O module 502 operating the authenticate all incoming requests from the management service 202c based on its internal credentials and certificates to ensure that the management service 202c is an authorized/legitimate management service.)

Thus, systems and methods have been described that provide for secure access to a network management domain provided for a system management domain/MCM group. For example, a computing system may include a chassis that houses I/O module(s) that are configured to provide a network management domain and that include a master I/O module. The computing system also includes a management module that is coupled to each of the I/O module(s). The management module includes an enclosure controller that coupled to each of the I/O module(s) via a first communication channel, with the enclosure controller operating to retrieve master I/O module secured access information from the master I/O module via the first communication channel. The management module also includes a management service coupled to the enclosure controller via a second communication channel and to each of the I/O module(s) via a third communication channel, with the management service retrieving the master I/O module secured access information from the enclosure controller via the second communication channel, and performing validation operations with the master I/O module via the third communication channel such that the management service may securely access the network management domain via the master I/O module. As such, following the validation operations, the management service in the computing system is provided secure access to the network management domain provided via the master I/O module. Furthermore, the management service may provide the master I/O module secure access information to management services in other computing systems that are part of its system management domain/MCM group to enable those management services to perform similar validation operations in order to securely access the network management domain via the master I/O module as well.

As will be appreciated by one of skill in the art in possession of the present disclosure, the systems and methods of the present disclosure provide management services in computing systems the ability to determine the location of a master I/O module that provides the network management domain for the system management domain/MCM group to which its computing system belongs, which enables communication across computing systems in the MCM group to retrieve master I/O module secured access information that may be utilized to establish secured communications between any management service in the MCM group and that master I/O module. Furthermore, the systems and methods of the present disclosure automate the securing of those management service/master I/O module communications (e.g., without user intervention or instruction) via credential and certificate information collection, as well as the ability to reestablish those management service/master I/O module communications with an master I/O module when a slave I/O module takes over for an I/O module that previously operated as the master I/O module.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secured network management domain access system, comprising:
a Multi-Chassis Management (MCM) group that includes a first chassis and a second chassis that are each part of a system management domain that is managed by one of a first computing system provided in the first chassis and a second computing system provided in the second chassis, wherein the first chassis houses:
at least one first Input/Output (I/O) module that is configured to provide a single network management domain for the MCM group with at least one second I/O module housed in the second chassis, wherein the at least one first I/O module includes a master I/O module; and
a first management module that is coupled to each of the at least one first I/O module, wherein the first management module includes:
a first enclosure controller that is coupled to each of the at least one first I/O module via a first communication channel, wherein the first enclosure controller is configured to:
retrieve master I/O module secured access information from the master I/O module via the first communication channel; and
a first management service that is coupled to the first enclosure controller via a second communication channel and to each of the at least one first I/O module via a third communication channel, wherein the first management service is configured to:
retrieve the master I/O module secured access information from the first enclosure controller via the second communication channel;
perform, using the master I/O module secured access information, first validation operations with the master I/O module via the third communication channel such that the first management service may securely access the single network management domain via the master I/O module; and
transmit the master I/O module secured access information to a second management service housed in the second chassis, wherein the master I/O module is configured to perform second validation operations with the second management service using the master I/O module secured access information such that the second management service may securely access the single network management domain via the master I/O module.

2. The system of claim 1, wherein the first communication channel is provided via a secure hardware bus communication channel.

3. The system of claim 1, wherein the second communication channel is provided via an Open Authorization (OAuth)-based secured communication channel.

4. The system of claim 1, wherein the third communication channel is provided via a management Virtual Local Area Network (VLAN).

5. The system of claim 1, wherein the master I/O module is configured to:
broadcast an announcement that includes master I/O module metadata, and wherein the first management service is configured to:
receive the announcement; and
request, using the master I/O module metadata, the master I/O module secured access information from the enclosure controller.

6. The system of claim 1, wherein one of the at least one second I/O module housed in the second chassis is configured to transition to operate as the master I/O module in place of the at least one first I/O module.

7. An Information Handling System (IHS), comprising:
a processing system; and
a memory system that is coupled to the processing system and that includes instructions that, when executed by the processing system, cause the processing system to provide a first management module that includes:
a first enclosure controller that is coupled via a first communication channel to each of at least one first I/O module that is included in a first chassis and that is configured to provide a single network management domain for a Multi-Chassis Management (MCM) group with at least one second I/O module housed in a second chassis that is included with the first chassis in the MCM group and that is part of a system management domain with the first chassis, wherein the system management domain is managed by one of a first computing system provided in the first chassis and a second computing system provided in the second chassis, and wherein the first enclosure controller is configured to:
  retrieve master I/O module secured access information via the first communication channel from a master I/O module that is included in the at least one first I/O module; and
a first management service that is coupled to the first enclosure controller via a second communication channel and to each of the at least one first I/O module via a third communication channel, wherein the first management service is configured to:
  retrieve the master I/O module secured access information from the first enclosure controller via the second communication channel;
  perform, using the master I/O module secured access information, first validation operations with the master I/O module via the third communication channel such that the first management service may securely access the single network management domain via the master I/O module; and
  transmit the master I/O module secured access information to a second management service housed in the second chassis, wherein the master I/O module is configured to perform second validation operations with the second management service using the master I/O module secured access information such that the second management service may securely access the single network management domain via the master I/O module.

8. The IHS of claim 7, wherein the first communication channel is provided via a secure hardware bus communication channel.

9. The IHS of claim 7, wherein the second communication channel is provided via an Open Authorization (OAuth)-based secured communication channel.

10. The IHS of claim 7, wherein the third communication channel is provided via a management Virtual Local Area Network (VLAN).

11. The IHS of claim 7, wherein the first management service is configured to:
  receive an announcement that was broadcast by the master I/O module and that includes master I/O module metadata; and
  request, using the master I/O module metadata, the master I/O module secured access information from the enclosure controller.

12. The IHS of claim 7, further comprising:
  the first chassis that houses the first management module.

13. The IHS of claim 7, wherein one of the at least one second I/O module housed in the second chassis is configured to transition to operate as the master I/O module in place of the at least one first I/O module.

14. A method for providing secure access to a network management domain, comprising:
  retrieving, by a first enclosure controller via a first communication channel from a master I/O module that is included in at least one first I/O module that is included in a first chassis and that is configured to provide a single network management domain for a Multi-Chassis Management (MCM) group with at least one second I/O module housed in a second chassis that is included with the first chassis in the MCM group and that is part of a system management domain with the first chassis, master I/O module secured access information, wherein the system management domain is managed by one of a first computing system provided in the first chassis and a second computing system provided in the second chassis;
  retrieving, by a first management service that is coupled to the first enclosure controller via a second communication channel and to each of the at least one first I/O module via a third communication channel, the master I/O module secured access information from the first enclosure controller via the second communication channel;
  performing, by the first management service using the master I/O module secured access information, first validation operations with the master I/O module via the third communication channel such that the first management service may securely access the single network management domain via the master I/O module; and
  transmitting, by the first management service, the master I/O module secured access information to a second management service housed in the second chassis, wherein the master I/O module is configured to perform second validation operations with the second management service using the master I/O module secured access information such that the second management service may securely access the single network management domain via the master I/O module.

15. The method of claim 14, wherein the first communication channel is provided via a secure hardware bus communication channel.

16. The method of claim 14, wherein the second communication channel is provided via an Open Authorization (OAuth)-based secured communication channel.

17. The method of claim 14, wherein the third communication channel is provided via a management Virtual Local Area Network (VLAN).

18. The method of claim 14, further comprising:
  receiving, by the first management service, an announcement that was broadcast by the master I/O module and that includes master I/O module metadata; and
  requesting, by the first management service using the master I/O module metadata, the master I/O module secured access information from the enclosure controller.

19. The method of claim 14, wherein the first management service and the enclosure controller are housed in the first chassis.

20. The method of claim 14, further comprising:
  transitioning, by one of the at least one second I/O module housed in the second chassis, to operate as the master I/O module in place of the at least one first I/O module.

* * * * *